United States Patent
Allen-Ware et al.

(10) Patent No.: US 10,571,983 B2
(45) Date of Patent: Feb. 25, 2020

(54) CONTINUOUSLY AVAILABLE POWER CONTROL SYSTEM

(71) Applicant: International Business Machines Corporation, Armonk, NY (US)

(72) Inventors: Malcolm S. Allen-Ware, Tucson, AZ (US); Kanak B. Agarwal, Austin, TX (US); Charles Lefurgy, Austin, TX (US); Guillermo J. Silva, Cedar Park, TX (US); Thomas W. Keller, West Lake Hills, TX (US); Karthick Rajamani, Austin, TX (US); Yang Li, Pittsburgh, PA (US); Ramakrishnan Rajamony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 15/635,522

(22) Filed: Jun. 28, 2017

(65) Prior Publication Data
US 2019/0004579 A1  Jan. 3, 2019

(51) Int. Cl.
*G06F 1/26* (2006.01)
*G05B 15/02* (2006.01)
(Continued)

(52) U.S. Cl.
CPC ............. *G06F 1/266* (2013.01); *G05B 15/02* (2013.01); *G06F 1/26* (2013.01); *G06F 1/263* (2013.01);
(Continued)

(58) Field of Classification Search
None
See application file for complete search history.

(56) References Cited

U.S. PATENT DOCUMENTS 6,230,252 B1    5/2001  Passint et al.
7,243,142 B2    7/2007  Poirot et al.
(Continued)

FOREIGN PATENT DOCUMENTS

CN  103501242 A  1/2014
WO  9817043 A2   4/1998

OTHER PUBLICATIONS

Pfeiffer, Clemens, "Software-Defined Power: The Path to Ultimate Reliability", May 30, 2013. (Year: 2013).*
(Continued)

*Primary Examiner* — Qing Yuan Wu
(74) *Attorney, Agent, or Firm* — Isaac J. Gooshaw

(57) ABSTRACT

A computer controls power distribution. The computing system determines a topography for a power delivery system that powers a group of computing devices. The computing system determines a number of worker programs for a pool of worker programs based on the topography. The computing system generates the pool of worker programs. The pool of worker programs includes both the number of worker programs and a number of back-up worker programs. The computing system generates a number of power management tasks to manage power consumption through one or more power elements included in the topography of the power delivery system. The computing system sends one or more power management tasks to a worker program included in the pool of worker programs.

20 Claims, 16 Drawing Sheets

(51) Int. Cl.
*G06F 1/3296* (2019.01)
*G06F 1/3209* (2019.01)
*G06F 1/3228* (2019.01)
*G06F 1/3203* (2019.01)
*G06F 1/3215* (2019.01)
*G06F 1/3206* (2019.01)
*G06F 1/32* (2019.01)

(52) U.S. Cl.
CPC .......... *G06F 1/3203* (2013.01); *G06F 1/3206* (2013.01); *G06F 1/3209* (2013.01); *G06F 1/3215* (2013.01); *G06F 1/3228* (2013.01); *G06F 1/3296* (2013.01); *G06F 1/32* (2013.01)

(56) References Cited

U.S. PATENT DOCUMENTS

| | | |
|---|---|---|
| 8,209,395 B2 | 6/2012 | Richoux |
| 8,667,049 B2 | 3/2014 | Blumrich et al. |
| 8,774,625 B2 | 7/2014 | Binkert et al. |
| 8,797,843 B2 | 8/2014 | Kamath et al. |
| 9,124,959 B2 | 9/2015 | Xu et al. |
| 9,143,338 B2 | 9/2015 | Fricker |
| 9,325,604 B2 | 4/2016 | Li et al. |
| 9,442,786 B2 | 9/2016 | Singh et al. |
| 9,531,596 B2 | 12/2016 | Volpe et al. |
| 2007/0253437 A1 | 11/2007 | Radhakrishnan et al. |
| 2011/0307715 A1 | 12/2011 | Diab |
| 2013/0322838 A1 | 12/2013 | Julien et al. |
| 2014/0006815 A1 | 1/2014 | Castro-Leon et al. |
| 2014/0149715 A1 | 5/2014 | Inman |
| 2014/0188996 A1 | 7/2014 | Lie et al. |
| 2015/0055952 A1 | 2/2015 | Younce et al. |
| 2015/0098700 A1 | 4/2015 | Zhu et al. |
| 2015/0237421 A1 | 8/2015 | Morgan et al. |
| 2016/0070282 A1 | 3/2016 | Chapel et al. |
| 2016/0077570 A1 | 3/2016 | Varadarajan et al. |
| 2016/0210261 A1 | 7/2016 | Oprea |
| 2016/0323037 A1 | 11/2016 | Leigh et al. |
| 2016/0335209 A1 | 11/2016 | Jau et al. |
| 2016/0380895 A1 | 12/2016 | Xiong et al. |
| 2017/0054524 A1 | 2/2017 | Gumaste et al. |
| 2018/0052431 A1* | 2/2018 | Shaikh .................. G06F 9/5094 |

OTHER PUBLICATIONS

Mell et al., "The NIST Definition of Cloud Computing," U.S. Department of Commerce, National Institute of Standards and Technology, Special Publication 800-145, Gaithersburg, MD, Sep. 2011, pp. 1-7.

Ajima et al., "Tofu: A 6D Mesh/Torus Interconnect for Exascale Computers," Computer, IEEE Computer Society, vol. 42, Issue 11, 2009, pp. 36-40.

Cray, "Cray XT3 Datasheet," Cray XT3™ Supercomputer Scalable by Design, © 2005 Cray, Inc., 6 pgs.

Punhani, et al., "A Modified Diagonal Mesh Interconnection Network," 2014 Annual IEEE India Conference (INDICON), © 2014 IEEE, pp. 1-6.

Tang et al., "Diagonal and Toroidal Mesh Networks," IEEE Transactions on Computers, vol. 43, No. 7, Jul. 1994, pp. 815-826.

Leroux et al., "New Developments on Tore Supra Data Acquisition Units", WEPMN020, Proceedings of ICALEPCS2011, Grenoble, France, Copyright © 2011, pp. 922-925.

Dockès et al., "30.8. Diskless Operation with PXE Chapter 30. Advanced Networking", <https://www.freebsd.org/doc/handbook/network-diskless.html>, C. (2017), pp. 1-7.

* cited by examiner

US 10,571,983 B2

CONTINUOUSLY AVAILABLE POWER CONTROL SYSTEM

BACKGROUND OF THE INVENTION

The present invention relates generally to the field of power management, and more particularly to the allocation of power and management of power consumption in a hierarchical power distribution network.

A data center is a facility used to house computer systems and associated components, such as servers, telecommunication devices, storage systems, or the like. A data center can occupy one room of a building, one or more floors, or an entire building. Most of the equipment is often in the form of servers mounted in rack cabinets, which are usually placed in single rows forming corridors (so-called aisles) between them. This aisle configuration allows people access to the front and rear of each cabinet. Servers differ greatly in size from one shelf space (1U) servers to large freestanding storage silos, which may occupy many square feet of floor space. Some equipment such as mainframe computers and storage devices are often as big as the rack cabinets themselves and are placed alongside the rack cabinets.

SUMMARY

Embodiments of the present invention provide a method, system, and program product for controlling power distribution. A computer determines a topography for a power delivery system that powers a group of computing devices. The computer determines a number of worker programs for a pool of worker programs based, at least in part, on the topography. The computer generates the pool of worker programs, wherein the pool of worker programs includes (i) the number of worker programs and (ii) a number of back-up worker programs. The computer generates a number of power management tasks to manage power consumption through one or more power elements included in the topography of the power delivery system. The computer sends one or more power management tasks to a worker program included in the pool of worker programs.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
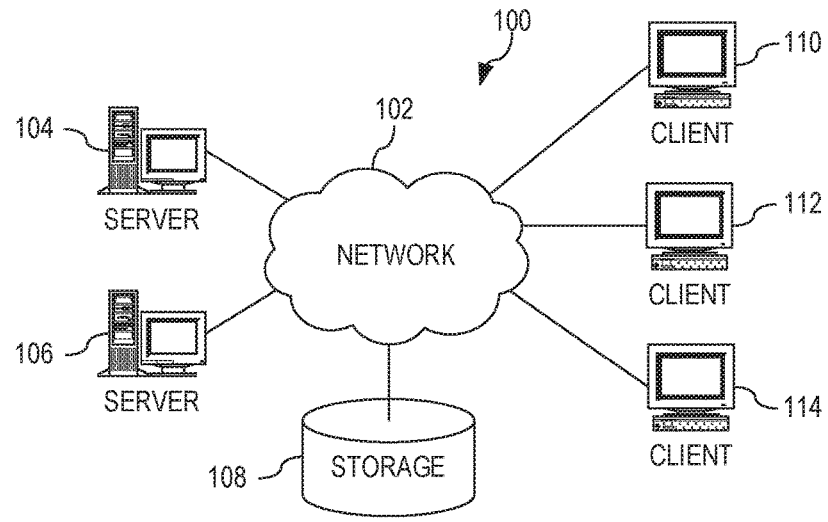
FIG. 1 is an example diagram of a distributed data processing system in which aspects of the illustrative embodiments may be implemented.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

I. Introduction

Warehouse-scale data centers consist of many thousands of machines running a diverse set of workloads and comprise the foundation of the modern web. Such data centers are typically designed to protect against (i) unacceptably high levels of power being sent to and/or consumed by various components and (ii) unacceptably large variations in available power/loss of power. The power delivery infrastructure supplying these data centers is typically equipped with circuit breakers designed to protect the data center from damage due to electrical surges and backup power systems to supply power in the event of main power supply being lost. While tripping a circuit breaker ultimately protects the physical infrastructure of a data center, its application-level effects can be disastrous, leading to long service outages at worst and degraded user experience at best. In addition, the loss of power to a warehouse-scale data center can also damage the physical infrastructure of the data center itself due to the improper shut-down of equipment. Further, such a loss of power and damaged equipment may result in significant degradation in the level of service provided to users of the data center.

For computers and networking equipment located within a data center, power supply units (or PSUs) convert mains AC to low-voltage regulated DC power for the internal components of those computers and networking equipment. Modern and networking equipment typically use switched-mode power supplies. Some power supplies have a manual switch for selecting input voltage, while others automatically adapt to the mains voltage. Several direct-current voltages are often required, and those voltages must be regulated with some accuracy to provide stable operation of the computer. A power supply rail or voltage rail refers to a single voltage provided by a PSU. The overall power draw on a PSU is typically limited by the fact that all of the supply rails come through one transformer and any of its primary side circuitry, like switching components. Although a power supply with a larger than needed power rating will have an extra margin of safety against overloading, such a unit is often less efficient and generally wastes more electricity at lower loads than a more appropriately sized unit.

A power distribution unit (PDU) or mains distribution unit (MDU) is a device fitted with multiple outputs designed to distribute electric power, especially to racks of computers and networking equipment located within a data center. Data centers often face challenges in power protection and management solutions. As such, many data centers rely on PDU monitoring to improve efficiency, uptime, and growth. PDUs vary from simple and inexpensive rack-mounted power strips to larger floor-mounted PDUs with multiple functions including power filtering to improve power quality, intelligent load balancing, and remote monitoring and control by local area network (LAN) or Simple Network Management Protocol (SNMP). This kind of PDU placement can offer capabilities such as power metering at the inlet, outlet, and PDU branch circuit level and support for environment sensors.

In data centers, larger PDUs are often needed to power multiple server cabinets. Each server cabinet or rows of cabinets may require multiple high current circuits, possibly from different phases of incoming power or different uninterruptible power supplies, also called uninterruptible power sources, (UPSs). Standalone cabinet PDUs are self-contained units that include main breakers, individual circuit breakers, and power monitoring panels. The cabinet provides internal bus bars for neutral and grounding.

In general, a UPS, which may include battery and/or flywheel power backup, is an electrical apparatus that provides emergency power to a load when the input power source or mains power fails. A UPS is typically used to protect hardware such as computers, data centers, telecommunication equipment, or other electrical equipment where an unexpected power disruption could cause injuries, fatalities, serious business disruption, or data loss. UPS units range in size from units designed to protect a single computer to large units powering entire data centers or buildings. A UPS differs from an auxiliary or emergency power system or standby generator in that it will provide fast response protection from input power interruptions, by supplying energy stored in batteries, super-capacitors, or flywheels. However, the on-battery runtime of most uninterruptible power sources is relatively short (often only a few minutes) but is sufficient to start a standby power source or properly shut down the protected equipment. Therefore, power management efficiency during runtime of most uninterruptible power sources can impact the overall level of service provides by a data center during the transition from the UPS to a more long-term power source, such as a backup generator.

Given the potential outcomes of tripping circuit breakers and/or losing power, data center operators have traditionally taken a conservative approach by over-provisioning data center power, provisioning for worst-case power consumption, and further adding large power buffers, and adding multiple sources/levels for backup power. While such an approach may improve safety and reliability with higher confidence, it is often wasteful in terms of power infrastructure utilization, which is a limited data center resource.

II. Power Sources and Backup Power Sources

In many data centers, there is (i) at least one main power supply, typically a local power utility that supplies the data center with power, under normal/typical operating conditions and (ii) one or more backup power sources managed by power distribution system. In the event of a power failure/loss of power from the main power supply, the data center draws power from the back-up power sources.

One type of back-up power source is an uninterruptible power source (UPS) system. Three general categories of uninterruptible power source (UPS) systems include on-line, line-interactive and standby UPS systems. An on-line UPS uses a "double conversion" method of accepting AC input, rectifying to DC for passing through the rechargeable battery (or battery strings), then inverting back to, for example, 120 V/230 V AC for powering the protected equipment. A line-interactive UPS maintains the inverter in line and redirects the battery's DC current path from the normal charging mode to supplying current when power is lost. In a standby ("off-line") system the load is powered directly by the input power and the backup power circuitry is only invoked when the utility power fails. Most UPS below 1 kVA are of the line-interactive or standby variety, which are usually less expensive than their on-line counterparts.

The offline/standby UPS (SPS) may provide surge protection and battery backup. The protected equipment is normally connected directly to incoming utility power. If incoming voltage falls below or rises above a predetermined level, then the SPS turns on its internal DC-AC inverter circuitry, which is powered from an internal storage battery. The UPS then mechanically switches the connected equipment on to its DC-AC inverter output. The switchover time can be as long as, for example, 25 milliseconds, depending on the amount of time it takes the standby UPS to detect the lost utility voltage. In general, a UPS is designed to power certain equipment, such as a server computer, without any significant dip or brownout to that device such that device function is impaired above a threshold.

The line-interactive UPS is similar in operation to a standby UPS, but with the addition of a multi-tap variable-voltage autotransformer. This is a special type of transformer that can add or subtract powered coils of wire, thereby increasing or decreasing the magnetic field and the output voltage of the transformer. This may also be performed by a buck-boost transformer which is distinct from an auto-transformer, since the former may be wired to provide galvanic isolation. Line-interactive UPS are often able to tolerate continuous under-voltage brownouts and over-voltage surges without consuming the majority of a limited reserve battery's power. Instead, line-interactive UPSs compensate by automatically selecting different power taps on an autotransformer.

In an on-line UPS, the batteries are always connected to the inverter, so that no power transfer switches are necessary. When power loss occurs, the rectifier simply drops out of the circuit and the batteries keep the power steady and unchanged. When power is restored, the rectifier resumes carrying most of the load and begins charging the batteries, though the charging current may be limited to prevent the high-power rectifier from overheating the batteries and boiling off the electrolyte. One advantage of an on-line UPS is its ability to provide an "electrical firewall" between the incoming utility power and sensitive electronic equipment.

Other categories of UPS systems include hybrid topology/double conversion on demand, ferro-resonant, DC power, and rotary systems. For example, in some power units, Dynamic Uninterruptible Power Supplies (DUPS) are sometimes used. A synchronous motor/alternator is connected on the mains via a choke. Energy is stored in a flywheel of a rotary system. When the mains power fails, an eddy-current regulation maintains the power on the load as long as the flywheel's energy is not exhausted. DUPS are sometimes combined or integrated with, for example, a diesel generator that is turned on after a brief delay, forming a diesel rotary uninterruptible power supply (DRUPS).

UPS systems also come in several different forms and sizes. Two common forms are tower and rack-mount. Tower models stand upright on the ground or on a desk/shelf, and are typically used in network workstations or desktop computer applications. Rack-mount models can be mounted in rack enclosures and can require anywhere from 1U to 12U (rack space) and are typically used in server and networking applications.

Given the number of options available to provide power solutions for computer devices, there typically exist a number of challenges to be overcome in order to provide consistent power at the needed levels when a cloud-based distributed network of computing devices needs that power.

For example, a problem in the combination of a double-conversion UPS and a generator can be voltage distortion created by the UPS. The input of a double-conversion UPS is essentially a big rectifier. The current drawn by the UPS is non-sinusoidal. This can cause the voltage from the AC mains or a generator to also become non-sinusoidal. The voltage distortion then can cause problems in all electrical equipment connected to that power source, including the UPS itself. It will also cause more power to be lost in the wiring supplying power to the UPS due to the spikes in current flow. This level of "noise" is measured as a percentage of "total harmonic distortion of the current" (THDI). Classic UPS rectifiers have a THDI level of around 25%-30%. To reduce voltage distortion, this requires heavier mains wiring or generators more than twice as large as the UPS. As such, there are several solutions to reduce the $THD_I$ in a double-conversion UPS including (i) passive power-factor correction (passive-PFC) that uses passive filters reduce THDI to, for example, 5%-10% at full load, and (ii) active power-factor correction (active-PFC) that uses an active filter. Through the use of an active filter, THDI can drop to, for example, 5% over the full power range.

III. Electric Power Systems and Circuit Breakers

An electric power system is a network of electrical components deployed to supply, transfer, and use electric power. An example of an electric power system is the network that supplies a region's homes and industry with power—for sizeable regions, this power system is known as the grid and can be broadly divided into the generators that supply the power, the transmission system that carries the power from the generating centers to the load centers and the distribution system that ultimately feeds the power to power consuming devices.

In many data centers, there is a hierarchical power distribution system. For example, in one data center there is a local power utility that supplies the data center with 35 MW of power. The 35 MW of power is fed to an on-site power sub-station that in turn feeds the utility power to a group of Main Switch Boards (MSBs), with each MSB rated at 2.75 MW for information technology (IT) equipment power and has a UPS and standby generator that provide power in the event of a utility outage. In the data center, there are rooms where racks of servers are arranged in rows and a number of MSBs provide power to each room. Each MSB supplies up to four 1.3 MW Switch Boards (SBs). From each SB, power is fed to 200 KW Remote Power Panels (RPPs) stationed at the end of each row of racks. Each remote power panel (RPP) supplies power to both (i) the racks in its row and (ii) a set of Direct Current Uninterruptible Power Supplies (DCUPS) that provide 120 seconds of power backup. Each power device is equipped with a circuit breaker that trips if the device's power draw exceeds the breaker's rated power. However, circuit breakers do not trip instantly.

Both customer and power-system equipment are designed to operate within a range of voltages, usually within ±5% of the nominal voltage. At low voltages, many types of equipment perform poorly; e.g., light bulbs provide less illumination, induction motors can overheat and be damaged, and some electronic equipment will not operate at all. Conversely, high voltages can damage equipment and shorten their lifetimes. AC systems supply or consume two kinds of power: real power and reactive power. Real power accomplishes useful work while reactive power supports the voltage that must be controlled for system reliability. Reactive power may affect the stability of power systems because reactive power affects voltages throughout the system. Voltage control in an electrical power system is used to maintain proper operation for electrical power equipment to prevent damage such as, for example, overheating of generators and motors, to reduce transmission losses and to maintain the ability of the system to withstand and prevent voltage collapse. In general terms, decreasing reactive power causes voltage to fall, while increasing reactive power causes voltage to rise. A voltage collapse occurs when the system tries to serve much more load than the voltage can support. As voltage drops, current must increase to maintain power supplied, causing the power distribution system to consume more reactive power and the voltage drops further. If the current increases too much, transmission lines from the power source may overload and go off-line, which may in turn overload other lines and potentially causing cascading failures. Further, if the voltage drops too low, some generators will disconnect automatically to protect themselves. A voltage collapse occurs when an increase in load, or reduction in power generation, or transmission facilities such as power lines, causes a drop in voltage, which causes a further reduction in reactive power from capacitor and line charging, leading to still further voltage reductions. If voltage reduction continues, these voltage reductions will cause additional elements to go offline, leading further reduction in voltage and loss of the load. The result of such progressive and uncontrollable declines in voltage is that the system is unable to provide the reactive power required to supply the reactive power demand.

On an alternating-current (AC) power system, voltage is controlled by managing production and absorption of reactive power. In general, RPPs are systems that provide automatic compensation to changes in voltage by varying reactive power such that voltage is maintained within a range, for example, the voltage for power being sent to consuming devices connected to a low voltage network is maintained within a ranges of acceptable voltages as main power sources come online. RPPs often utilize one or both of capacitors and inductors (which are sometimes called reactors), which both are passive devices that generate or absorb reactive power. The output of capacitors and inductors is proportional to the square of the voltage. Thus, a capacitor bank (or inductor) rated at 100 MVAR will produce (or absorb) only 90 MVAR when the voltage dips to 0.95 pu but it will produce (or absorb) 110 MVAR when the voltage rises to 1.05 pu. This relationship is helpful when inductors are employed to hold voltages down. Inductors are discrete devices designed to absorb a specific amount of reactive power at a specific voltage.

In general, a circuit breaker trips when both (1) the current through the circuit breaker exceeds the circuit breaker's rated current and (2) the circuit breaker sustains the overdrawn power for a period of time inversely proportional to the overdraw amount. In other words, though circuit breakers trip quickly under large power spikes, they sustain low amounts of overdrawn power for long periods of time. For example, RPPs and Racks sustain a 10% power overdraw for around 17 minutes. In addition, lower-level devices in the power delivery hierarchy sustain relatively more power overdraw than higher-level devices. For example, an RPP sustains a 30% power overdraw for around 50 seconds while an MSB sustains only a 12% power overdraw for the same period of time.

In order to satisfy the power needs of a cloud-based distributed network of computing devices power must be provided at the needed levels as consistently as is manageable. As such, many solutions exist for power management for networks of computing devices.

IV. Power Management

While power utilization efficiency of a data center is impacted by the availability of power and prevention of electrical power surges, under-utilizing available data center power may cause a significant negative impact to power utilization efficiency because power is frequently a bottleneck resource that limits the number of servers that a data center can house. To improve data center power utilization efficiency, some solutions to increase power utilization efficiency of a data center implement a policy of over-subscription of data center power. With over-subscription, the planned peak data center power demand is intentionally allowed to surpass data center power supply, under the assumption that correlated spikes in server power consumption are infrequent. However, this may expose data centers to the risk of tripping power breakers due to highly unpredictable power spikes (e.g., a natural disaster or a special event that causes a surge in user activity for a service). Further, a power failure in one data center could cause a redistribution of load to other data centers that in turn results in a tripping of their circuit breakers, which leads to a cascading power failure event. To achieve both power safety and improved power utilization with over-subscription, power capping, or peak power management techniques, have been proposed. These techniques (1) continually monitor server power consumption and (2) use processor and memory dynamic voltage and frequency scaling (DVFS) to suppress server power consumption if it approaches its power or thermal limit. However, there are challenges to implementing over-subscription techniques and DVFS solutions as part of data center-wide power management solution that monitor all levels of the power hierarchy and make coordinated control decisions. Some of these challenges arise from data center-wide power management and the issue of coordinating across different levels of controllers for power distribution. A such, an increase power utilization efficiency may be provided by implementing a continuously available data center-wide power management system that monitors the entire power hierarchy and makes coordinated control decisions to safely and efficiently use provisioned data center power. In general, respective actions of SDP worker programs and SDP manager programs are coordinated through the use of one or both of highly available locking services and database services.

Some known power management solutions implement a policy of power capping, which limits the amount of power that available for consumption by a server to a range of power. One design consideration for power capping techniques is how fast to respond to power overdraw in order to guarantee protection from tripping circuit breakers. In most power over subscription solutions, power is typically oversubscribed at each level, i.e., a power device supplies less power than its children draw at peak. Because power oversubscription occurs at every level of the power delivery hierarchy, it is generally insufficient for power capping techniques to monitor any single device or subset of devices in a data center. Instead, techniques must take a holistic approach that coordinate action across all devices in the power delivery hierarchy. In addition, because (i) each power device is equipped with a circuit breaker that trips if the device's power draw exceeds the breaker's rated power, and (ii) those breakers do not trip instantly, some embodiments of the present invention recognize that opportunities exist for minimizing negative impacts to server performance while still ensuring power safety.

Some embodiments of the present invention provide an increase in reliability for a peak power management system by leveraging mechanisms of self-healing and/or redundancy for that power management system, i.e., the management system is able to perform self-corrective actions in the event of a failure of one or more of its own components. In general, embodiments of the present invention interact with and control, at least in part, manage a collection of power management workers/controllers in a reliable manner to provide power management of networked equipment. Some embodiments of the present invention provide enforcement of power policies on both "bare-metal", i.e., physical devices, and virtual machine servers (i.e., virtual devices). Some embodiments of the present invention are not reliant on collection of data from a network switch to perform power management. Some embodiments of the present invention use a wiring topography of a data center to determine how to coordinate multiple tasks that jointly enforce a peak power consumption limit. Some embodiments of the present invention modify settings of a power control system of computers whose power is controlled by the power control system. In some embodiments of the present invention, a power management service is operating, at least in part, inside the same computers for which it is providing power management reliability. Embodiments of the present invention provide worker programs that are assigned to and control, at least in part, multiple types of components including but are not limited to uninterruptible power supplies (UPSs), remote power panels (RPPs), and server racks. Embodiments of the present invention recognize that there are multiple locations/components to which a worker/controller may be assigned to manage power in a networked system.

In some power management solutions, a UPS reports its status to the computer it powers via a communications link such as a serial port, Ethernet and Simple Network Management Protocol, global system for mobile communications (GSM)/general packet radio service (GPRS) or universal serial bus (USB). A subsystem in the OS processes the reports and generates notifications, PM events, or commands an ordered shut down. Some UPS manufacturers publish their communication protocols, but other manufacturers use proprietary protocols, which can create challenges in the integration of such UPS systems in a widely distributed power management solution, e.g. such as one deployed for use in a cloud-based distributed network of computing devices.

SNMP is an Internet-standard protocol for collecting and organizing information about managed devices on IP networks and for modifying that information to change device behavior. Devices that typically support SNMP may include, for example, cable modems, routers, switches, servers, and workstations. SNMP is widely used in network management for network monitoring. SNMP exposes management data in the form of variables on the managed systems organized in a management information base (MIB) which describe the system status and configuration. These variables can then be remotely queried (and, in some circumstances, manipulated) by managing applications.

Computer-to-UPS control methods may be used for one-to-one signaling from a single source to a single target. For example, a single UPS may connect to a single computer to provide status information about the UPS, and allow the computer to control the UPS. Similarly, the USB protocol may connect a single computer to multiple peripheral devices. In some known solutions, a single large UPS is able to communicate with several protected devices. For traditional serial or USB based control solutions, a signal replication device may be used, which may allow one UPS to connect to five computers using serial or USB connections. However, signal splitting is typically only one direction, i.e., from UPS to the devices, to provide status information. Return control signals may only be permitted from one of the protected systems to the UPS. In some such solutions, control signals are sent between a single UPS and multiple computers using standard Ethernet data communication methods such as TCP/IP.

In some known solutions, distribution of UPS status and control data requires that all intermediary devices, such as Ethernet switches or serial multiplexers, be powered by one or more UPS systems, in order for the UPS alerts to reach the target systems during a power outage. To avoid the dependency on Ethernet infrastructure, some known solutions connect a UPS directly to a main control server by using GSM/GPRS channel. The short message service (SMS) or GPRS data packets sent from UPSs may be used to, for example, trigger software to shut down computing systems to reduce the load.

Embodiments of the present invention recognize that, in certain known solutions, power capping may be provided as a system function. In such power management scenarios, power controllers are typically integrated into servers, chassis management units, or other management components that are associated with hardware infrastructure. Embodiments of the present invention recognize that, in certain known solutions, there is little direct integration of such dynamic power control capabilities at IT equipment level for managing the power/current constraints in the data center power distribution network. Embodiments of the present invention recognize that, in certain known solutions, there is lack of common/standard data center (DC)-level infrastructure for power capping/management. Embodiments of the present invention recognize that, in certain known solutions, to address the need for managing power consumption in the data center within constraints/limits of the power distribution network, the practice relies on servers that are designed to operate within server line-cord limits and racks being populated assuming sum of the line cord limits for the rack power distribution unit not exceed the limits of the branch-circuit feed the rack Embodiments of the present invention recognize that, in certain known solutions, certain less conservative approaches leverage an estimated maximum power consumption that is based on server configuration in order to limit the number of servers (assuming all servers can attain that load simultaneously) that can load branch circuit(s) feeding the rack. Such solutions can result in stranded power, and wasted resources in the power distribution hierarchy. For example, a rack fed by single-phase 230V/30 A branch circuit can supply 6900 W. If 10 servers with estimated maximum consumption of 500 W are installed, only 1900 W are left to install additional servers. If the 10 servers were consuming only 350 W each, then 1500 W is left stranded, i.e., not useable by any other servers since they might (in a rare situation, i.e., a scenario that is statistically unlikely) still go up to 5 KW.

Some embodiments of the present invention recognize that, in certain known solutions, power management may be provided using (i) active dedicated servers for power management, and (ii) dedicated backup servers in standby, which mitigate failures of the dedicated servers. However, embodiments of the present invention recognize that such solutions remain vulnerable to issues from server/hardware failures e.g., when both the dedicated servers and dedicated backup servers in standby all fail. For example, both the main servers and the backup servers that are dedicated to providing power management for the remaining servers lose power or suffer hardware failure. The servers that provide service to the customers are left without power management, resulting in an increase in inefficiency of power utilization and the tripping of breakers and shut down of the servers that provide service to customers.

Certain embodiments of the present invention provide a power management solution that provisions virtual machines/containers. Such embodiments recognize that provisioning with virtual machines/containers provides increased adaptability to system changes (e.g., addition and removal of hardware and work load) and power changes when compared to known solutions that are provisioned with dedicated, physical hardware.

Certain embodiments of the present invention ensure that a given electrical line has a steady current draw that does not exceed specified percentage of a maximum current rating for that electrical line while (i) improving rack-level power density by utilizing the dual-circuit power track power feeds for a rack (for example, a typical load is allowed to exceed 80% of a single circuit power track's rating) and (ii) improving Uninterruptible Power Supplies (UPS) and power distribution costs by sizing them based, in part, on typical rather than for worst-case.

Certain embodiments of the present invention manage point of delivery (PoD)/total information technology (IT) current/power load within specified current/power limits. Certain embodiments of the present invention manage point of delivery (PoD)/total information technology (IT) current/power load in excess of specified current/power limits such that the excess is maintained for less than a duration that, if met or exceeded, would result in unacceptable wear or damage to components that receive that excess. Certain embodiments of the present invention recognize that the amount of wear or damage that is accumulated by a component is directly influenced by the current/power, and changes thereto, that are applied to that component over time.

As used herein, a PoD is a module that includes a combination of network hardware, computing hardware, data storage hardware, and computer program components that work together to deliver a networking service. A PoD is, in general, a repeatable design pattern, and its components increase modularity, scalability, and manageability of data centers. In some scenarios, a PoD is added to a service provider infrastructure, for example, to an existing datacenter supporting cloud computing services, in order to sustain scalability as usage of the provided cloud computing service grows.

Certain embodiments of the present invention provide response times to changes in load (due to, for example, failures, addition of equipment, or rapid increases in load) that are fast enough to keep temporary oversubscription within electrical ratings and thermal ratings of power distribution circuits and equipment. Certain embodiments of the present invention maintain availability of service through control plane upgrades, IT equipment failures, and power distribution failures. Certain embodiments of the present invention provide common/standard data center (DC)-level infrastructure for power capping/management. Certain embodiments of the present invention provide reductions in stranded power, and wasted resources in the power distribution hierarchy. Certain embodiments of the present invention incorporate mechanisms for priority-aware power capping for hierarchical power distribution networks. In certain scenarios, such embodiments provide increased granularity in power management such that power is distributed to where it is most needed in a data center. For example, in the event of a significant decrease in available power (e.g., the mains go offline) reserve/backup power is proportionately distributed based, at least in part, on associated priorities of various parts of the data center. In some such embodiments, Software Defined Power (SDP) workers are configured to factor available power and priorities when determining power distribution for the data center following the processes of priority-aware power capping executed by power controllers in section VI, below. A more detailed discussion of priority-aware power capping for hierarchical power distribution networks is provided in section VI, below, and with specific reference to FIGS. 4-8 and their associated descriptions.

Embodiments of the present invention provide a cloud-native Software Defined Power (SDP) worker service for increased reliability and scalability. Certain embodiments of the present invention provide a power management service that is broken into two components: (1) SDP managers: responsible for ensuring service health, top-level communication with external world (e.g. add a server rack or remove a server rack) and (2) SDP workers: responsible for implementing specific power capping logic for the PoD. Certain embodiments of the present invention provide SDP managers and SDP workers that are implemented as services running in highly portable virtual machines/containers. As such, these SDP managers and SDP workers are not tied to running on particular server/microworker. Instead, these SDP managers and SDP workers execute on or move to any available computer that is in communication with the data center. In some embodiments, SDP managers are provided that monitor one or more of: (i) a state of a given worker program, (ii) progress in completion of a given control task by the given worker program, (iii) one or both of addition and deletion of power elements from a power delivery system, (iv) for non-completion of tasks by a given worker program within a predetermined time. In some embodiments, SDP managers are provided that control one or both of (i) assignment of new tasks to worker programs and (ii) re-assignment of tasks from one worker program to another.

Certain embodiments of the present invention provide SDP managers that (i) are replicated only for availability, (ii) coordinate their activity using a replicated, highly available database, and (iii) maintain their state using a replicated, highly available database. In general, SDP managers are redundant virtual machines (VMs)/containers that ensure the control is maintained in the event of failure in one or more parts of the power management system, which includes both hardware and software components of the cloud-based distributed network of computing devices. In certain embodiments, the SDP manager is executed as an independent parallel process inside each "worker" VM/container. Certain embodiments of the present invention provide worker and manager functions are executed both independently and concurrently of each other.

Certain embodiments of the present invention provide a plurality of SDP workers, wherein each worker is uniquely responsible for a specific "power-constrained node" (e.g., circuit-breaker for a server rack) in the power distribution hierarchy. Certain embodiments of the present invention recognize that the loss of a worker results in a loss in service for specific portion of the data center until the lost worker is replaced by another worker. As such, embodiments of the present invention provide a set of rules that limit the duration a worker is allowed to be unresponsive before a different worker is tasked (via assignment of a control task) with maintaining the given "power-constrained node." Certain embodiments of the present invention provide coordination of replacing one worker with another using data included in a replicated, highly available database. Certain embodiments of the present invention provide one or more of: (1) task management that implements specific power consumption limits for specific circuits, (2) workers that read sensor data, and (3) leaf workers that set power caps on individual servers. In such embodiments, a control task completion deadline is set for the worker based, at least in part, on the time a circuit breaker is predicted to trip due to a level of a power fault in the data center that persists for a period of time.

Embodiments of the present invention encompass a technique for controlling a collection of physical devices. The technique has three general processes, and a fourth process that is optional in some embodiments. In a first process, a control problem is partitioned into distributed set of smaller "tasks", i.e., control tasks, (which may have input/output dependencies) each of which is about managing the aggregate power draw on specific circuit/point in the power distribution topology. e.g., fuse in a power strip, branch circuit feeding a rack, circuit feeding a remote power panel, transformer output, datacenter/room-level power consumption. In a second process, the control tasks are distributed across a pool of SDP workers (herein also called "workers", and VMs/containers, for resiliency, by a pool of SDP managers. In a third process, SDP workers are assigned a control task deadline by which time they complete their control task/work (e.g. 30 seconds) and repost the result. Certain embodiments recognize that failure of an SDP worker to complete the assigned work can cause oversubscription of a specific circuit that puts an associated set of devices (getting power through that circuit) at risk of failure. In certain embodiments, in a fourth process, only one worker at a time is allowed to interact with physical device, e.g. servers. Some such embodiments recognize that due to device limitations, for example bandwidth, that may result in the device not responding or generating errors when overloaded with requests.

V. Example Embodiments

The present invention will now be described in detail with reference to the Figures.

Figure 9:
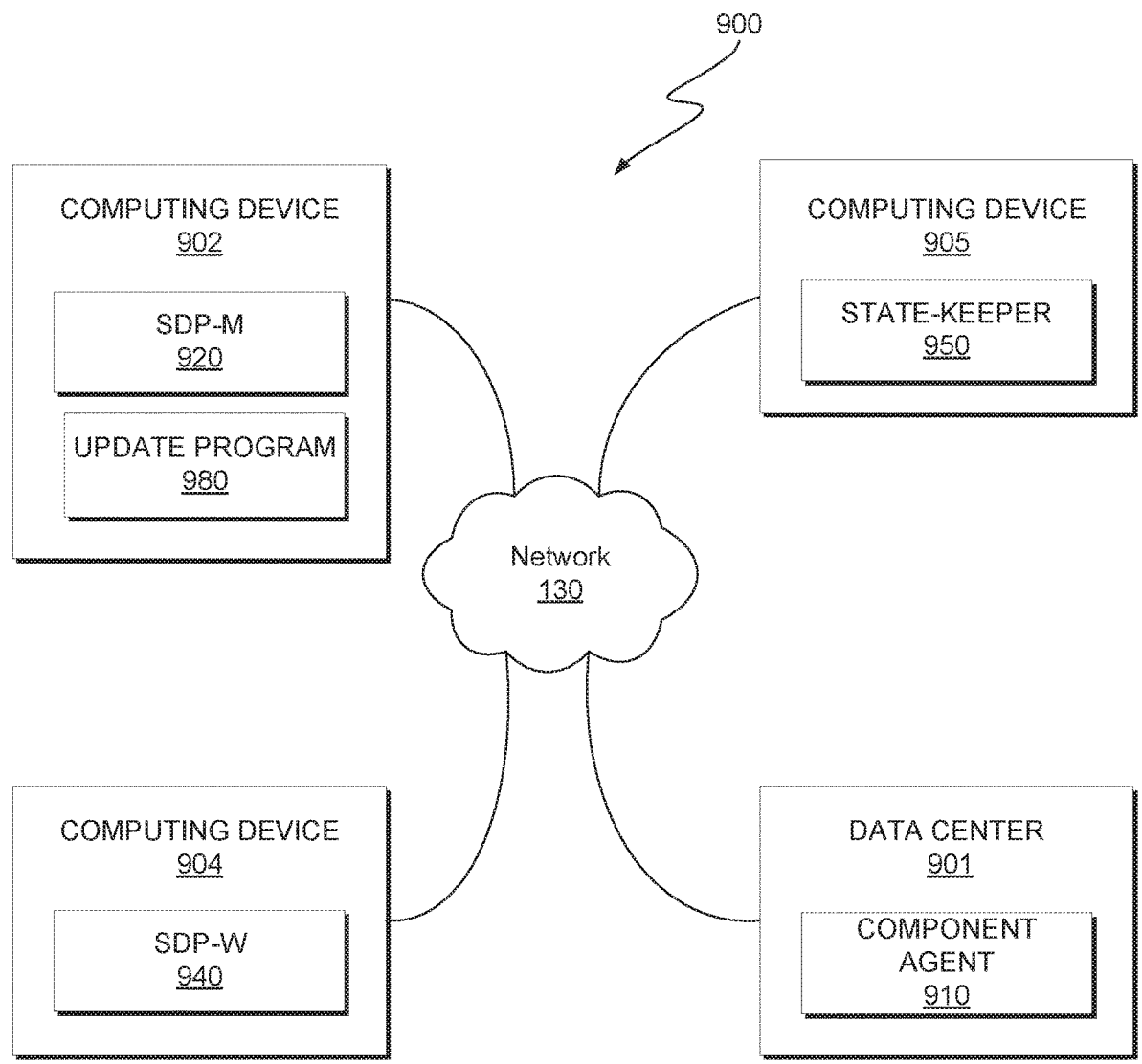
FIG. 9 is a functional block diagram illustrating a power management environment, in accordance with an exemplary embodiment of the present invention.

FIG. 9 is a functional block diagram illustrating a power management environment, generally designated 900, in accordance with one embodiment of the present invention. Power management environment 900 includes (i) data center 901, which is executing component agent 910; (ii) computing device 902, which is executing software defined power manager (SDP-M) 920 and update program 980; (iii) computing device 902, which is executing software defined power worker (SDP-W) 940; and (iv) computing device 905, which is executing state-keeper 950; all of which are connected over network 930. In this embodiment, SDP-M 920, SDP-W 940 are deployed on different computing systems that are located at different computing facilities. Further, while only one instance of both SDP-M 920 and SDP-W 940 are shown, it is understood that multiple instances of one or both are within the scope of this invention. For example, by leveraging multiple instances of SDP-M 920 and SDP-W 940, the functions of SDP-M 920 and SDP-W 940 become re-deployable in the event of a failure or fault in either SDP-M 920 or SDP-W 940.

Further detailed description of SDP-W 940, SDP-M 920, data center 901, state-keeper 950, and update program 980 can be found in at least the discussion of FIG. 10-15. Further detailed description of component agents, such as component agent 910, is found in at least the description of component agents 1014, 1024, and 1071, with reference to FIG. 10.

In various embodiments of the present invention, data center 901, computing device 902, computing device 904, and computing device 905 are each, respectively, a computing device that can be a standalone device, a server, a laptop computer, a tablet computer, a netbook computer, a personal computer (PC), or a desktop computer. In another embodiment, data center 901, computing device 902, computing device 904, and computing device 905 respectively represent individual computing systems that utilize clustered computers and components to act as a single pool of seamless resources. In general, data center 901, computing device 902, computing device 904, and computing device 905 can be any computing device or a combination of devices with access to component agent 910, SDP-M 920, SDP-W 940, and state-keeper 950, and is capable of executing the features and functions of component agent 910, SDP-M 920, SDP-W 940, state-keeper 950, and update program 980. Data center 901, computing device 902, computing device 904, and computing device 905 may include internal and external hardware components, as depicted and described in further detail with respect to FIG. 2. Further, power management environment 900 may include one or more features of distributed data processing system 100 as is shown in FIG. 1 and described herein below. For example, in some embodiments, the features and functions of network 102 and network 930 are synonymous such that they each include at least some of the features and functions of each other. In one embodiment, the features and functions of data center 901 includes the features and functions of one or both of server 104 and server 106. In one embodiment, the features and functions of computing device 905 and state-keeper 950 include the features and functions of storage 108.

In this exemplary embodiment, component agent 910, SDP-M 920, SDP-W 940, state-keeper 950, and update program 980 are stored on computing device 902, computing device 904, computing device 905, and data center 901. However, in other embodiments component agent 910, SDP-M 920, SDP-W 940, state-keeper 950, and update program 980 may be stored externally and accessed through a communication network, such as network 930. Network 930 can be, for example, a local area network (LAN), a wide area network (WAN) such as the Internet, or a combination of the two, and may include wired, wireless, fiber optic or any other connection known in the art. In general, network 930 can be any combination of connections and protocols that will support communications between component agent 910, SDP-M 920, SDP-W 940, state-keeper 950, update program 980, computing device 902, computing device 904, computing device 905, and data center 901, in accordance with a desired embodiment of the present invention.

As shown in FIG. 9, one or more of the computing devices, e.g., 902, 904, 905 and data center 901, may be specifically configured to implement a mechanism for power distribution networks. The configuring of the computing device may comprise the providing of application specific hardware, firmware, or the like to facilitate the performance of the operations and generation of the outputs and real-world changes in the power supplied to components as described herein with regard to the illustrative embodiments. The configuring of the computing device may also, or alternatively, comprise the providing of software applications stored in one or more storage devices and loaded into memory of a computing device, such as, for example, computing device 902, computing device 904, computing device 905, and data center 901, for causing one or more hardware processors of the computing device to execute the software applications that configure the processors to perform the operations and generate the outputs described herein with regard to the illustrative embodiments. Moreover, any combination of application specific hardware, firmware, and software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device per se. Such configuration is not to be construed as limiting the computing device to providing only those specialized functions. For example, in some embodiments, servers used by SDP workers and SDP managers are also used to execute user virtual machines, control various virtual machines, and/or provide other software/services etc. Moreover, as described hereafter, the implementation of the mechanisms of the illustrative embodiments improves the functionality of the computing device and provides a useful and concrete result that facilitates power distribution to physical components by leveraging highly available software defined power workers and highly available software defined power managers.

Figure 2:
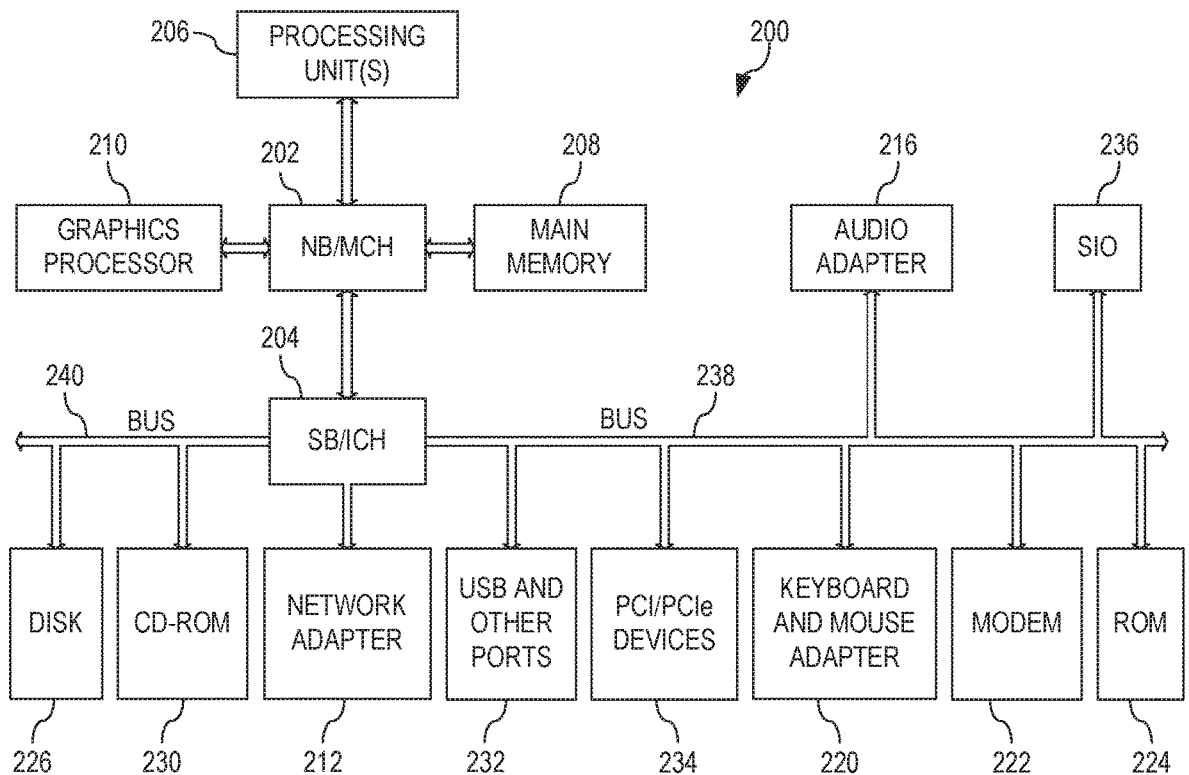
FIG. 2 is an example block diagram of a computing device in which aspects of the illustrative embodiments may be implemented.

As noted above, the mechanisms of the illustrative embodiments utilize specifically configured computing devices, or data processing systems, to perform the operations for power distribution using highly available software defined power workers and highly available software defined power managers. In some embodiments, the highly available software defined power workers and highly available software defined power managers are leveraged in conjunction with mechanisms for priority-aware power capping for hierarchical power distribution networks. These computing devices, or data processing systems, may comprise various hardware elements, which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computing device, such as, for example, computing device 902, computing device 904, computing device 905, and data center 901 of FIG. 9, in which computer usable code or instructions implementing the processes and aspects of the illustrative embodiments of the present invention may be located and/or executed so as to achieve the operation, output, and external effects of the illustrative embodiments as described herein.

In general, state-keeper 950 is a highly available database that stores data regarding the state of data center 901 and its components therein. In general, state-keeper can be any storage facility that is widely replicated such that loss of one source for the data included in state-keeper 950, e.g. power is lost for a storage facility, does not prevent accessing a different copy of that data from another storage location that is available. For example, state-keeper 950 stores data regarding power supplied to data center 901, power draw by servers or racks of servers included in data center 901. Further details regarding the functioning of state-keeper 950 and the types of data stored to and read from state-keep 950 are readily apparent to one of ordinary skill in the art in light of at least the discussion of FIGS. 11-15. In general, FIG. 9 illustrates a power management environment in which a power management policy is implemented, in accordance with an exemplary embodiment of the present invention. Such a power management policy follows a set of rules, which include but are not limited to rules for the generation of, and control of, worker programs that receive and process instructions (i.e., control tasks) that manage, at least in part, the power flowing to/within data center 901. In response to one or more criteria for alteration of a power management policy being met, an SDP manager program initiates the generation of a new power management task for a given power element (of a power delivery system) based, at least in part on the change that occurred. As used herein, power management tasks include, but are not limited to, one or both of (i) control tasks that are processed by SDP-W programs and (ii) management tasks that are processed by SDP-M programs.

Figure 10:
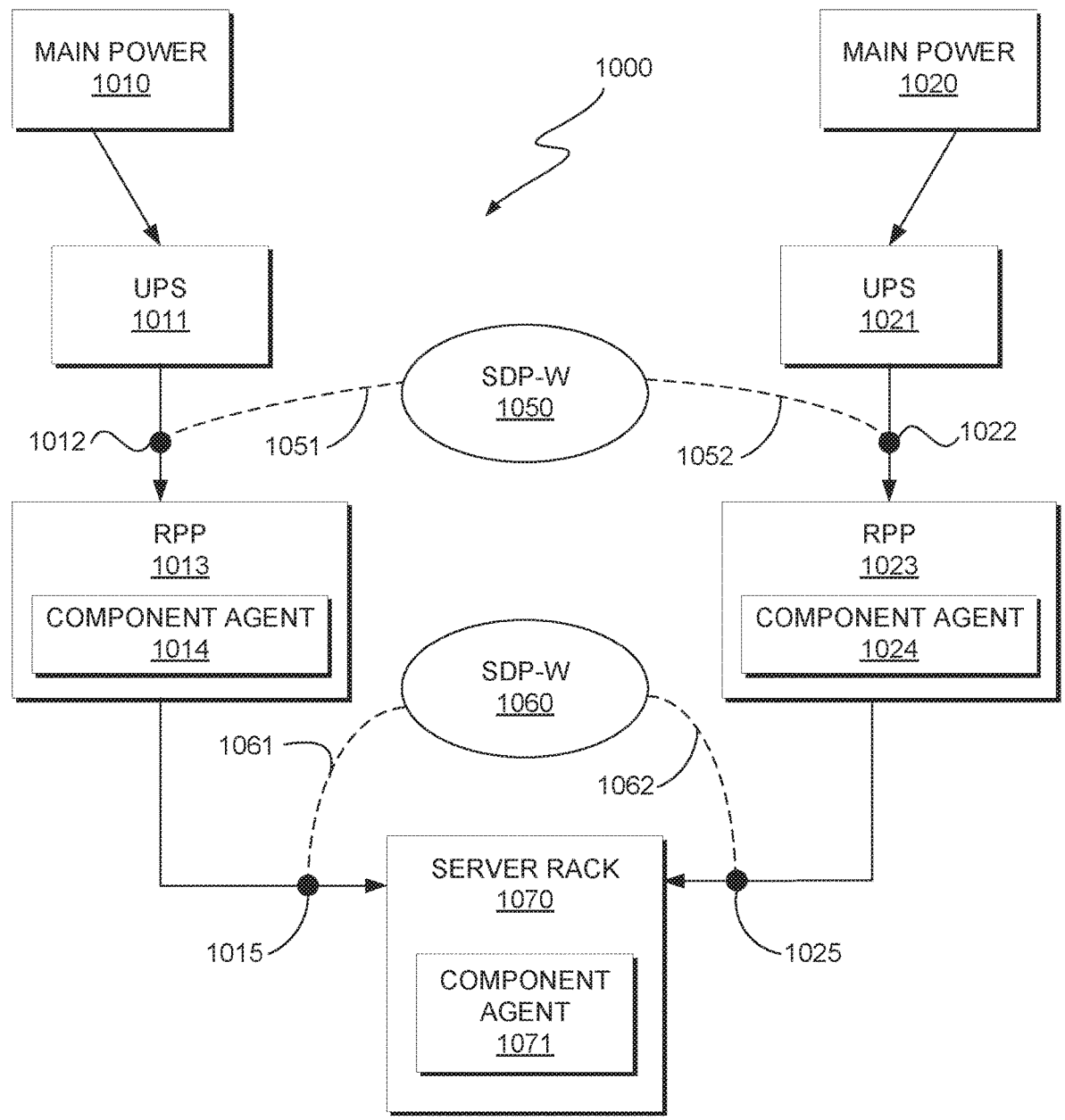
FIG. 10 is a functional block diagram illustrating a data center environment, in accordance with an exemplary embodiment of the present invention.

FIG. 10 is a functional block diagram illustrating a flow of power in data center environment, generally designated 1000, in accordance with an exemplary embodiment of the present invention. As shown in FIG. 10, data center environment 1000 includes main power (MP) 1010, main power (MP) 1020, uninterruptible power supply (UPS) 1011, uninterruptible power supply (UPS) 1021, remote power panel (RPP) 1012, remote power panel (RPP) 1023, software defined power worker (SDP-W) 1050, software defined power worker (SDP-W) 1060, and server rack 1070. As shown in FIG. 10, RPP 1013 includes component agent 1014, RPP 1023 includes component agent 1024, and server rack 1070 includes component agent 1071. Note that, while note shown in FIG. 10, SDP-W 1050 and SDP-W 1060 are respectively in communication with and process control tasks received from a software defined power manager as described previously and shown in FIG. 9 (for example, SDP-M 920). A more detailed discussion of power supplies can be found above in section II (Power Sources and Backup Power Sources).

As illustrated in FIG. 10, data center environment 1000 includes SDP-W 1050 that is connected to and controls, in part, power flowing from RPP 1013 and RPP 1023 to server rack 1070 (power flow denoted using arrows), via a component agent 1071 and SDP-W 1060. In this embodiment, a SDP-W 1050 monitors the power supplied by UPS 1011 and 1021. In certain embodiments, SDP-W 1050 receives sensor data from UPS 1011 and UPS 1021 by accessing data stored on state-keeper 950. In some embodiments, SDP-W 1050 also receives sensor data from RPP 1013 and RPP 1023 by accessing data stored on state-keeper 950. Similarly, SDP-W 1060 receives sensor data from RPP 1013, RPP 1023, and server rack 1070 by accessing data stored on state-keeper 950.

In one embodiment, an SDP-W is assigned (tasked with) the completion of a control task for at least one control point and is thus responsible for managing all the equipment downstream of that control point either (i) indirectly (e.g., by budget allocation to downstream workers) or (ii) directly (e.g., by power cap allocation to servers below the control point). As such, in one embodiment, certain components are managed directly, while others are managed indirectly. In general, the SDP-W is seen to have a specific point of influence that coincides with a space between two points in the hierarchy and the consequence of exerting influence over that control point is a direct or indirect propagation of that influence to downstream components. In one interpretation, such a propagation conceptualized as a field of influence. In general, the power allocation for each device (i) has a direct influence on the load in the network and (ii) serves as an independent schedulable resource for a compute task (with own priority etc.). As such, in one embodiment, the power allocation for each device is decided by an associated SDP-W for a leaf control node (typically associated with the rack task).

In one embodiment, the associated SDP-W (i) communicates with a component agent associated with each device (e.g., the power agents on a group of servers) and (ii) performs shifting of the power budget between the devices the SDP-W manages. As denoted, using dashed lines, in FIG. 10, the point of influence of SDP-W 1050 extends to both power pathways, the first starting with main power source 1010 and the other starting with main power source 1020. With the power from main power source 1010, the point of influence of SDP-W 1050 begins at UPS 1011 and ends at RPP 1013 (see dashed line 1051). Likewise, with the power from main power source 1020, the point of influence of SDP-W 1050 begins at UPS 1021 and ends at RPP 1023 (see dashed line 1052). Similarly, the point of influence of SDP-W 1060 extends to both power pathways, the first starting with main power source 1010 and the other starting with main power source 1020. With the power from main power source 1010, the point of influence of SDP-W 1060 begins at RPP 1013 and ends at server rack 1070 (see dashed line 1061). Likewise, with the power from main power source 1020, the point of influence of SDP-W 1060 begins at RPP 1023 and ends at server rack 1070 (see dashed line 1062).

In general, FIG. 10 illustrates a number of control points, leveraged by various embodiments, that are used to modify power distribution in data center environment 1000. As used herein, a control point is a distribution point in the power distribution network associated with a specific power or current (amperage) limit. Examples of such control points include, but are not limited to, a branch circuit with a circuit breaker limit, a PoD with an overall power limit, and input side circuit breaker limit for a RPP panel. In one embodiment, these control points are managed, at least in part, by the execution of control tasks by SDP workers. As used herein, a control task is, in general, a task for managing power consumption through a control point at a level below the limit associated with the control point. For example, a rack task includes a specific set of control points that manage a three phase branch circuit control point that controls, in part, power to a three phase left circuit feeding left-side power strip, a three phase branch circuit control point for right circuit feeding right-side power strip, and six fuse control points for each of two fuses per phase in the power strip. With reference to FIG. 10, in this exemplary embodiment, by completing control tasks, SDP-W 1050 is responsible for and manages (i) RPP 1013 input at current control point 1012 and (ii) RPP 1023 input current control point 1022. Likewise, SDP-W 1060 is in charge of completing a rack task, which is a type of control task, for rack 1070, i.e. SDP-W 1060 is in charge of completing tasks that control input at current control points 1015 and 1025, which are associated with power delivery to and within the rack 1070.

In one embodiment, component agent 1014 and 1024 receive signals and instructions from SDP-W 1050 and change power output by RPP 1013 and RPP 1023 accordingly. Similarly, component agent 1071 modifies power usage of components included in server rack 1070. In this embodiment, server rack 1070 is included in data center 901. In some embodiments server rack 1070 is synonymous with and includes at least some of the features and functions of server 104 and 106 as shown in FIG. 1. In general, component agents 1014, 1024, and 1071 are light-weight programs deployed to specific components. For example, such component agents (i) obtain power data (from, for example power sensors associated with their components), and (ii) update the configuration data of their associated components in state-keeper 950. In some scenarios and embodiments, a node manager/firmware-based power capper in a server is a type of component agent. In some scenarios and embodiments, another type of component agent is firmware in an RPP that reads the inlet/branch circuit power consumption for the RPP. In one example, component agents 1071 are deployed to each server included in data center 901. In one embodiment, component agents 1014, 1024, and 1071 read power, communicates power usage data, execute power capping/uncapping commands, and communicate with SDP-W 1050 and 1060. In general, the communication between component agents 1014, 1024, and 1071 and SDP-W 1050 and SDP-W 1060 is one directional, i.e., component agents 1014, 1024, and 1071 respectively receive commands from SDP-W 1050 and SDP-W 1060 but do not send requests or responses to each other. In some scenarios and embodiments, component agents 1014, 1024, and 1071 use different options for reporting/managing the power associated with their respectively associated devices. In one example, a component agent is instructed to report regarding (i) supply power input for their associated device, and (ii) a power usage efficiency for their associated device. In one example, a component agent is told what components within the device to apply a power throttling action to, such as during the execution of power capping etc. In some embodiments, instead of such responses being specified by/determined with each new determination of a power capping value, such selective actions/responses to commands are preset options included as part of the component agent.

Additionally, in some embodiments, SDP-W 1050 and SDP-W 1060 respectively represent combinations of an SDP parent worker and SDP leaf workers that respectively communicate with one another using, in part, data sent to/retrieved from state-keeper 950. In such embodiment, the SDP parent worker has a parent-child relationship with its respective SDP leaf workers such that commands from the parent are disseminated to, and processed by, SDP leaf workers. In one embodiment, the SDP leaf workers communicate with the SDP parent worker through the SDP leaf workers located at leaf nodes in the controller hierarchy. In general, in one embodiment and scenario, an SDP leaf worker assigns budgets to all servers whose cap it manages. In one embodiment and scenario, an SDP parent worker assigns budgets to all its children SDP workers. Embodiments of the present invention recognize that there is additional resiliency provided by/associated with such SDP workers and their coordination.

For example, in one embodiment, a server rack 1070 has a set of hierarchical SDP leaf workers that are respectively associated with components or groups of components within server rack 1070. In one such embodiment, an SDP parent worker receives signals from SDP-W 1060 and disseminates commands accordingly to a number of SDP leaf workers deployed as part of various components included in server rack 1070. For example, an SDP parent worker of server rack 1070 receives a command from SDP-W 1060 that indicates that power for server rack 1070 is being reduced. In response to that signal, the SDP parent worker alters the amount of total power that can be drawn by server rack 1070 as a whole. However, the remaining power is not uniformly distributed within server rack 1070. In this example, each server blade in server rack 1070 has its own respective SDP leaf worker. In this example, power is distributed within the server by the SDP leaf workers based on a priority of each server blade respectively.

In this example, the SDP parent worker issues a series of commands to the SDP leaf workers that indicate the change in the available maximum power that server rack 1070 is allowed to draw. In response to the signals from the SDP parent worker, each respective SDP leaf worker modifies the maximum power that can be drawn by their respective server blades based on the priority of their server blade. As such, server blades that have a higher priority retain more processing ability, while server blades with a lower priority have a reduced processing ability due to the decrease in the maximum power they can draw. In this example, power is reduced by 50% by the SDP parent worker in response to a command from SDP-W 1060. The SDP parent worker sends out a signal that indicates that available power has been reduced by 50%. In response, four of the twelve SDP leaf workers reduce the maximum power draw for their respective server blades by 30% because those server blades have a high priority associated with them, while the remaining eight SDP leaf workers reduce the maximum power draw for their respective server blades by 60%.

In certain embodiments, SDP leaf workers calculate how much to alter their maximum power draw by such that each SDP leaf worker selects and implements a preset response based on the priority assigned to their respective server blades. In one example, the SDP leaf workers on high priority server blades respond to a 50% reduction by reducing the maximum power consumption of their server blades by 30%, while the SDP leaf workers on low priority server blades respond to a 50% reduction by reducing the maximum power consumption of their server blades by 60%. By leveraging multiple possible responses to the same signal, each SDP leaf worker retain the ability to dynamically react to changes in available power based on priority of their respective components. However, in other embodiments, the SDP leaf workers include programming that dynamically balances their aggregated maximum power draw such that components with higher priorities are allotted more power compared to components with lower priorities while the aggregated maximum power draw does not exceed the available power.

In one embodiment, MP 1010 and MP 1020 are power sources provided by public utility companies. Note that the source of power is not to be limited to a publically or privately available source of power. In general, MP 1010 and MP 1020 represent the primary source of power for data center environment 1000. In general, a primary source of power is a source that provides a majority of the power consumed by data center environment 1000 under typical operating circumstances. For example, a data center is powered by two different publically available utility sources, one is hydroelectric based and the other is a hydrocarbon based power utility. As such, these two power sources are the primary power sources (main power) for the data center. Note that while examples of main power sources are provided herein, embodiments are not limited to those examples. One having skill in the art recognizes that main power sources can provide main power based on a large variety of power sources.

In one embodiment, UPS 1011 and UPS 1021 are uninterruptible power supplies (UPSs). A more detailed description of UPSs can be found above in section II (Power Sources and Backup Power Sources). In general, UPS 1011 and UPS 1021 provide power in the event that a decrease in power, to below a threshold, is detected in one or both of MP 1010 and MP 1020. Note that while examples of UPSs are provided herein, embodiments are not limited to these examples. One having skill in the art recognizes that UPSs can provide back-up power based on a large variety of power sources.

In one embodiment, RPP 1013 and RPP 1023 are remote power panels. In general, remote power panels 1013 and 1023 are devices or combinations of devices that compensate for changes in voltage such that the power supplied to consuming devices is held within a range of voltages (see section III. Electric Power Systems and Circuit Breakers). As is understood by having ordinary skill in the art, there exist a number of technologies and devices that compensate for changes in voltage such that the power supplied to consuming devices is held within a range of voltages. As such, the types of devices and technologies included in RPP 1013 and RPP 1023 are not limited to the specific examples or technologies described herein.

Figure 11:
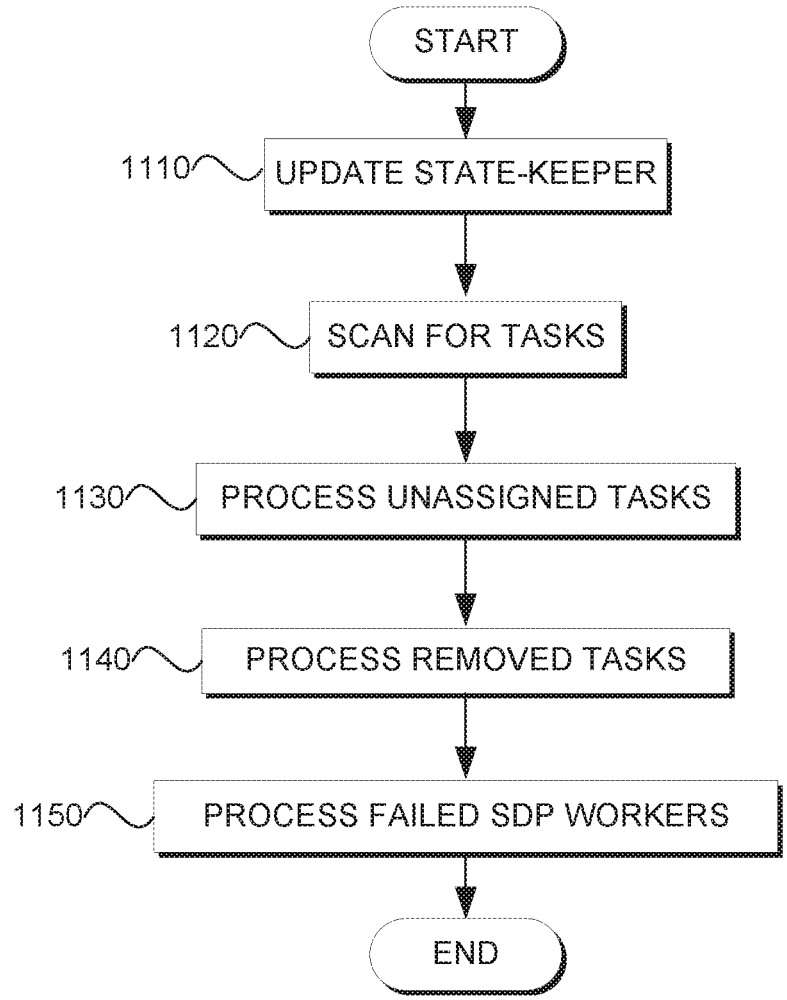
FIG. 11 illustrates operational processes of a distributed power management programs, executing on computing devices within the environment of FIG. 9, in accordance with an exemplary embodiment of the present invention.

FIG. 11 illustrates operational processes of a distributed power management programs, executing on computing devices within the environment of FIG. 9, in accordance with an exemplary embodiment of the present invention. In accordance with one embodiment, a method of controlling, at least in part, a collection of physical devices is disclosed, with reference to FIG. 11. Note that various features and functions discussed with reference to FIG. 11 are described in further detail with reference to the discussion of FIGS. 12-15.

In process 1110, a new device is added to data center 901 and data included in state-keeper 950 is updated to reflect these changes. For example, a fleetman.cp (control point) table is updated to specify which control task includes the new device. In some scenarios and embodiments, such a table of control tasks is denoted as a "task table" and is included as part of state-keeper 950. In one embodiment, the task table describes dependencies between control tasks. For example, control task 2 and control task 3 receive the budget output of control task 1. Control task 1 receives the sensor output of control task 2 and control task 3 etc.

In process 1120, a manager, such as SDP-M 920, continuously scans for management tasks, which can be viewed as problems that need remediation. In some scenarios and embodiments, SDP-M 920 determines a topography for a power system that powers at least a portion of data center 901. In some embodiments, SDP-M 920 accesses the data included in state-keeper 950 and determines a wiring topography (and changes thereto) of data center 901. In such embodiments, state-keeper 950 includes data that indicates the electrical connectivity between a variety of components included in a power system that supplies power to data center 901. In some scenarios and embodiments, SDP-M 920 identifies a change that has occurred with respect to one or more of (i) power from the first power system, (ii) the topography for a first power system, and (iii) the first group of computing devices. In some scenarios and embodiments, SDP-M 920 determines that the change meets a criteria for alteration in a power management policy for one or both of the power system powering data center 901, such as the power distribution policies for data center 901. Such policies include, but are not limited to, power caps and ranges of power that are allowed to be drawn by various components included in data center 901.

In one embodiment, SDP-M 920 determines a total number of control programs to be generated/included in a pool of SDP-W programs based, at least in part on the topography of the power system. In one embodiment, SDP-M 920 generates the pool of SDP-W programs using one or more computing devices that are powered by at least one power system that is independent to (i.e., electrically isolated from) the power sources that supply power to data center 901. As such, a loss in power for data center 901 does not directly impact the functional ability of the generated SDP-W.

In one embodiment, responsive to one or more criteria having been met, such as a new component being added, SDP-M 920 initiates the generation of a power management task responsive to and that reflects the criteria that was met. For example, the new power management task is generated in response to the newly added component. In one embodiment, based, at least in part, on a change to either the power supply to or to data center 901 itself, SDP-M 920 modifies at least one of (ii) an assignment of one or more SDP-W programs to components and (iii) the processing of one or more control tasks by one or more SDP-W programs. The management tasks may be, but are not limited to, (i) identification or generation of new control tasks that are not yet assigned to an SDP worker, (ii) a scenario in which an SDP worker 940 is attempting to complete a control task that no longer exists (a scenario which may result from, for example, equipment being removed from data center 901), (iii) a scenario in which an SDP worker 940 has failed to perform a control task within a specified period of time, and (iv) a scenario in which an SDP worker 940 has posted an error condition. In one embodiment, state information for tasks and SDP worker 940 resides/is maintained in a shared DB, such as, for example, state-keeper 950, that all SDP manager 920 and SDP worker 940 access, as needed, to perform various processes as described herein. In general, assignment of (i) managing power elements to management tasks and (ii) management tasks to SDP workers is determined based on a set of rules that account for trade-offs between one or more of: (i) a required level of responsiveness for a given controlled action, (ii) a resource needed to monitor certain power elements and control the power consumption of certain devices, (iii) a consistency of power allocation associated with a plurality of power elements in a topography of a power delivery system, (iv) an availability of a power management/control system as a whole to manage the power delivery system, and (v) a failing subset of worker programs. For example, in some embodiments, various weights are assigned to certain rules such that a weighed value dictates, in part, a response of an SDP-M accounts for differences in importance and/or priorities of various power elements of a power distribution system and their associated management tasks.

In process 1130-1150, below, an SDP manager is given a short-term lease on resources needed for a management task. Such resources may include, but are not limited to access to and control of at least part of various programs and/or hardware of a computing system. Remediation actions associated with a management task are to be completed by a deadline set for the SDP manager. If the remediation is not completed by the deadline, the short-term lease is automatically released, so another manager can attempt remediation. In one embodiment, the lease deadline is set such that it is short enough that, in the case of a manager failure, another manager will have time to remediate the issue and the SDP worker will have time to perform its first control action within the deadline to manage power for a given device. In one example, SDP-M 920 assigns an SDP-W program to a power element included in a topography of the power system powering data center 901.

In process 1130, SDP-M 920 processes unassigned control tasks. In one example, SDP-M 920 sends one or more power management tasks to the SDP-W programs and modifies management activity of that SDP-W program based, at least in part on whether the one or more power management tasks have been completed within a predetermined time period. For a new control task, SDP-M 920 scans the task table, included in state-keeper 950, and checks that each control task is in the "assignment" table (sdp.assignment). If a control task is not assigned, then SDP-M 920 obtains a short-term lease (using for example, light-weight locks, or paxos consensus algorithm, etc.) for the control task and an available (idle) SDP-W 940. SDP-M 920 initiates an automatic update to various tables included as part of state-keeper 950. In one embodiment, three of these tables comprise: (i) an assignment table that specifies the SDP worker assigned to the control task, (ii) a status table in which the assigned SDP-W 940 status is denoted as "busy", for example an sdp.worker table, and (iii) a health table in which is indicated the health status of a given SDP worker. For example, an sdp.health table includes a future deadline for SDP-W 940 to complete a first control action and a flag that indicates whether the first control action has been completed. In one embodiment, SDP-M 920 communicates directly to the selected SDP-W 940 to begin working on the new control task. In one embodiment, SDP-W 940 periodically checks the assignment table for control tasks associated with itself. If such a control task is identified, then SDP-W 940 begins working on that control task. In one example, responsive to a determination that an SDP-W program, assigned to a power element that powers data center 901, did not complete one or more power management tasks within a predetermined time period, SDP-M 920 (i) removes assignment of the power element from the SDP-W program and (ii) reassigns the power element to a different SDP-W program included in the pool of available and ready SDP-W programs.

In process 1140, SDP-M 920 processes "removed tasks". For a removed task, the SDP-M 920 scans the "busy", i.e., assigned, SDP worker 940 and identifies a control task being worked on that are not included in in the task table in state-keeper 950, if any exist. For such a control task, SDP-M 920 obtains locks for the SDP worker 940 associated that control task and then updates one or more tables included in state-keeper 950. In one embodiment, such updates include: (i) indicating, e.g. flagging, the SDP-W 940 as not being assigned to a control task, (ii) marking the status of that SDP-W 940 as "idle" in an SDP worker table, in state-keeper 950, and (iii) removing, from the health table (e.g., in sdp.health), the health entry for that SDP-W 940 regarding the control task. In one embodiment, SDP-M 920 directly communicates to the SDP-W 940 to tell SDP-W 940 to stop its current control task. In one embodiment, SDP workers are refreshed completely at this point, which can reduce the occurrence of certain unknown/unexpected types of errors. In one embodiment, SDP-W 940, associated with a removed task, exits execution and is restarted by an operating system (OS) in an SDP-W 940 environment (e.g. by an OS executing on computing device 904). In one embodiment, the SDP worker environment (VM) of the SDP-W 940 itself is stopped and restarted by an auto-scaling service by direction of SDP-M 920.

In one embodiment, for processes 1130 and 1140 above, SDP-M 920 adjusts the number of available SDP-W 940 (in a pool of SDP-W 940) by communicating with a distributed computing based auto-scaling service. For example, the number of SDP-W 940 in the pool is computed based, at least in part, on (i) the number of assigned control tasks, (ii) the number of unassigned control tasks, and (iii) some predetermined number of "hot", standby, idle SDP-W 940, which are currently ready to process control tasks. In one embodiment, the exact number of "spare" SDP-W 940 in the pool is computed based on rate of control tasks added/removed and a rate of failing SDP-W 940 such that there is always a hot, spare, idle SDP worker available when a control task is assigned to a new SDP worker. In some scenarios, such an approach helps ensure that an assigned SDP-W 940 will meet the deadline for its first control action for a given control task.

In process 1150, SDP-M 920 processes failed SDP workers. In general, an SDP-W 940 is deemed to have failed, i.e., to be a failed SDP worker, if the SDP-W 940 either (i) fails to complete a control task by a deadline or (ii) the SDP-W 940 sends a signal indicating that a fault has occurred. In one embodiment, for a failed SDP-W 940, SDP-M 920 scans the health table, in state-keeper 950, and looks for SDP-W 940 that have either (1) posted an error condition, or (2) failed to update their SDP worker health status within the device deadline. If such a SDP-W 940 is identified, then SDP-M 920 signals that particular SDP-W 940 to stop (as in process 1140) and cleanup all tables for this SDP worker and control task (similar to the processes described above in 1140). SDP-M 920 then re-assigns the control task of the failed SDP-W 940 to a new SDP-W 940 (similar to the processes described above in 1130).

Figure 12:
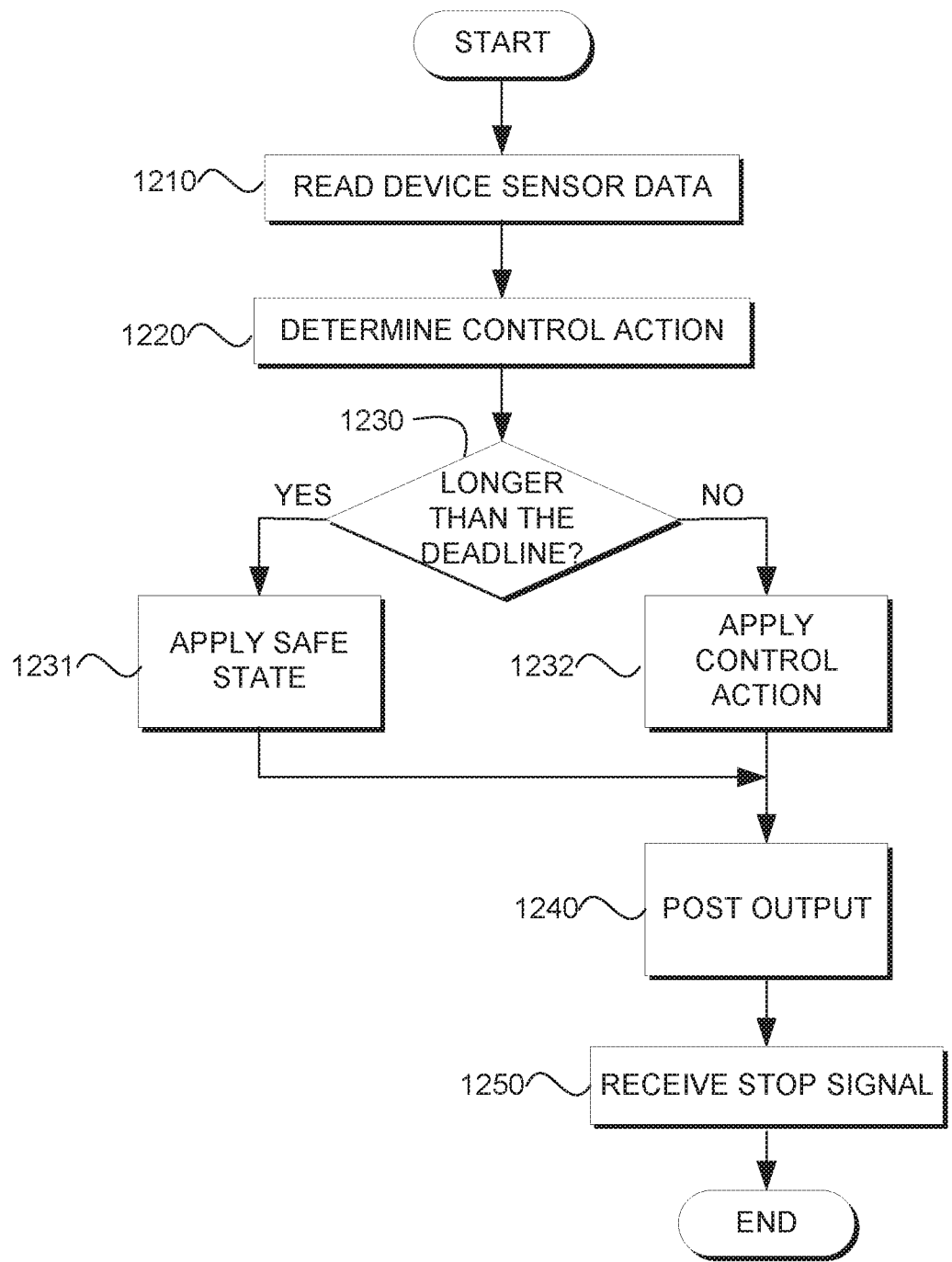
FIG. 12 illustrates operational processes of an SDP-W program, executing on a computing device within the environment of FIG. 9, in accordance with an exemplary embodiment of the present invention.

FIG. 12 illustrates operational processes of an SDP-W program, executing on a computing device within the environment of FIG. 9, in accordance with an exemplary embodiment of the present invention. In accordance with one embodiment, a method executed by a worker program is disclosed. In this embodiment the worker program controls, at least in part, a collection of physical devices is disclosed, with reference to FIG. 12.

In process 1210, SDP-W 940 obtains sensor data. If the control task is for a device, then SDP-W 940 reads the associated data from the device's sensors. If the control task is not for a device, then SDP-W 940 reads inputs of other associated SDP workers from a table included in state-keeper 950. For example, data is read from an input/output table (sdp.io) in state-keeper 950. In some scenarios, the read data includes (i) a budget from higher-level SDP-W 940, i.e. higher in terms of hierarchy, and/or (ii) data from sensors from a lower-level SDP worker.

In process 1220, SDP-W 940 determines a control action following the processes associated with the power worker described with reference to FIGS. 1-8 and regarding mechanisms for priority-aware power capping for hierarchical power distribution network. In general, the control action directly or indirectly completes at least a portion of a control task (assigned to a given SDP-W 940) that facilitates priority-aware power capping for hierarchical power distribution network.

In decision process 1230, SDP-W 940 determines whether an error condition has persisted for longer than the device deadline. Error conditions can be, but are not limited to, one or more of: (i) a communication break with a higher-level SDP-W (ii) failure to conform to a budget allotment for higher-level SDP-W (iii) a communication break with a sensor data from lower-level SDP worker (iv) failure to receive sensor data from lower-level SDP worker (v) failure to read/receive data of a power element sensor and (vi) failure to enforce power cap/limit for a power element/device by configuring the firmware/programming that manages the power of associated servers being fed from the power element. If the error condition has persisted for longer than the device deadline (decision process 1230, "YES" branch), then in process 1231, SDP-W 940 places the device into safe state (e.g., into a low power budget that is safe even under data center power fault). In general, a device safe state is an enforceable power budget allocation for a device that can be safely allotted to the device and removed from available power budget for peer devices. In this embodiment, the available power budget is controlled by the same parent worker of those peer devices. As such, the enforceable power budget allocation for the device is allotted to the device even if there are a number of failures in the power distribution, which the power distribution the service is expected to withstand. For example, such failures may include (i) a power supply failure for a server or (ii) one of two power utilities feeding the data center ceasing to supply power. In one embodiment, a given worker program responds to an error condition that persisted for more than a period of time by modifying one or both of (i) a power allocation and (ii) a control of a power element, based, at least in part, on one or more safe states that are configured to ensure the power delivery system continues to be managed in a safe manner, and wherein one or both of power allocation and control of the power element is managed by the given worker program through at least one assigned control task.

As used herein, a safe state is said to be safe with respect to a set of tolerated failures. In one embodiment, both a parent SDP-W and child SDP-W, which are responsible for the task managing a given device, have a consistent/same power allotment for a safe state for that device. As such, in the event of a break in communication between the parent SDP-W and SDP-W, the parent SDP-W and SDP-W both enforce a certain power allocation for that device. In one example, in a scenario in which the device is a server (and the SDP-worker has a leaf control task), a "safe state" assumption for that server would be the pcap_max value for the server (which is the maximum power the server can use under any load). In one such embodiment and scenario, a child SDP-worker determines that an uncontrolled server's allocation is pcap_max (a maximum power cap for the uncontrolled server) and caps all the other servers in the rack accordingly. As such, the budget allocated for the rack task can still be safely adhered to. Additionally, in this embodiment and example, the child SDP-worker communicates to its parent SDP-worker, by sending updated sensor data, the need for additional power (which results from using pcap_max for the uncontrolled server).

In one embodiment, when only consumption information is missing from the sensor data (and budget allocation and server control paths are operational) alternative/substitute consumption information is used. For example, in one such embodiment and scenario, since the power measurement associated with the circuits feeding power to the rack are unavailable, (e.g., consumption information is (i) missing from the sensor data and (ii) is not otherwise available to control the power consumption of the rack) a rack task controller uses sums of the power strip outlet measurements in place of the missing consumption information. In one embodiment, an SDP parent worker responds to a break in a monitoring ability of a given SDP child worker for a subset of power elements (which are assigned to the given SDP child worker program by a control task), by using one or both of (i) an alternate measurement for at least one of power consumption and load, and (ii) a pre-determined safe consumption value for at least one of a power consumption and a load of a computing device as a substitute, at least in part, for missing sensor data regarding the subset of power elements. If the error condition has not persisted for longer than the device deadline (decision process 1230, "NO" branch), then in process 1232, SDP-W 940 applies a control action to the device (e.g., SDP-W 940 sets power caps on servers, sets power assignments for subordinate lower-level SDP worker, etc.).

In process 1240, SDP-W 940 updates tables and data included in state-keeper 950. For example, SDP-W 940 posts outputs (e.g., sensors read, or budgets set) to, for example, a table included in state-keeper 950 (e.g., sdp.io) for associated SDP-W 940 to access as they process various control tasks. In another example, SDP-W 940 updates health status and posts any errors from processes 1210, 1220, and 1230 in a table included in state-keeper 950, e.g., SDP-W 940 updates a health table (sdp.health) and writes a new timestamp into the table for use during SDP-M 920 processes.

In process 1250, SDP-W 940 repeats processes 1210-1240 until signal received from an SDP manager to "stop" (in process 1250), at which point the SDP-W 940 stops working on the control task it is assigned.

Figure 13:
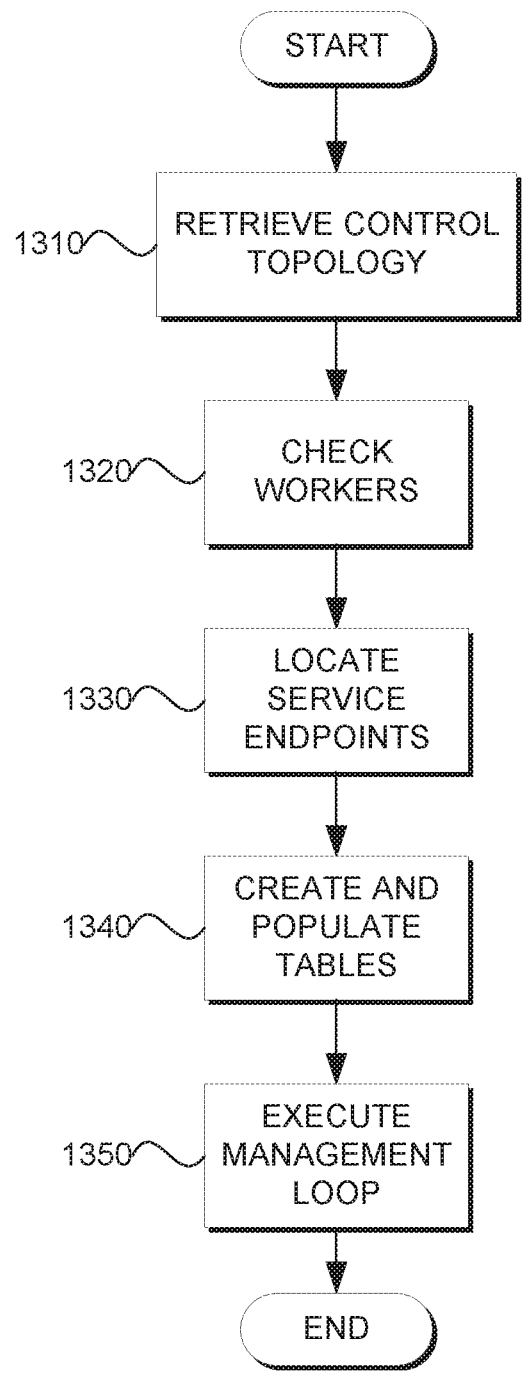
FIG. 13 illustrates operational processes of SDP-M program, on a computing device within the environment of FIG. 9, in accordance with an exemplary embodiment of the present invention.

FIG. 13 illustrates operational processes of SDP-M program, on a computing device within the environment of FIG. 9, in accordance with an exemplary embodiment of the present invention. In accordance with one embodiment, a method executed by an SDP manager program is disclosed. In this embodiment, the SDP manager controls, at least in part, a collection of physical devices is disclosed, with reference to FIG. 13.

In process 1310, SDP-M 920 (i) retrieves control topology (e.g. topology showing connections between RPPs, racks, and servers) to be managed using data included in state-keeper 950 and (ii) computes (a) a list of controlNodes (N) and power limit for each, and (b) determines a number of SDP-W 940 needed (e.g., N+2).

In process 1320, SDP-M 920 checks the status/state of the SDP-W 940 to ensure that the SDP worker services have started. In one embodiment, the check is performed by a single SDP manager and is coordinated through a distributed locking mechanism (may be supported by, for example, state-keeper 950). In one embodiment, SDP-M 920 uses an auto-scaling-group service to manage the number of instances needed for given topology, as topology changes the number of instances is changed.

In process 1330, SDP-M 920 locates SDP worker service end points. In process 1330, a single SDP manager performs mutual exclusion using a locking service, i.e., distributed locking. In one embodiment, the distributed locking is provided by a service. For example, in one service, such locks or sessions for mutual exclusion are provided in which the lock command provides a mechanism for simple distributed locking. The lock (or semaphore) is created at a given prefix in a key value store, and only when held, is a child process invoked. If the lock is lost or communication is disrupted, then the child process is terminated. In another example, in one service, light-weight transactions (a type of lock) are provided by/for a distributed no-structured query language (NoSQL) database management system designed to handle large amounts of data across many commodity servers that provides high availability with no single point of failure. Such mutual exclusions using a locking service are herein discussed with reference to the associated control points and SDP worker instance locks in light of the description for FIG. 11.

In process 1340, SDP-M 920 creates and populates datatables in state-keeper 950. In one embodiment, this creation and population is coordinated through a distributed locking mechanism. In one embodiment, the creation and population includes (a) creating and populating an SPD-manager-control-node-SDP-map table (e.g., a sdpmgr.controlNodeSdp-Map table) in state-keeper 950, and (b) creating and populating an SPD-manager-SDPcheck_table (i.e., a sdpmgr.sdpCheckTable) in state-keeper 950.

Figure 14:
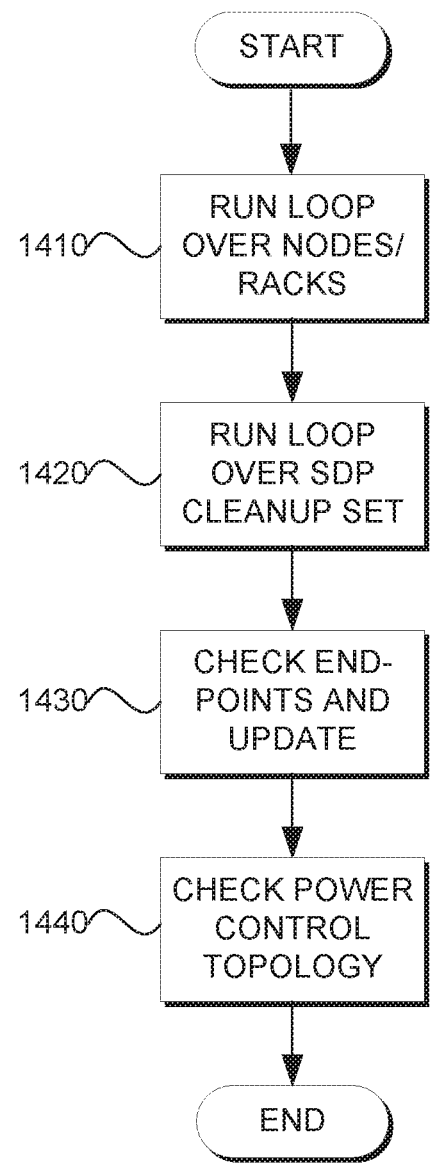
FIG. 14 illustrates operational processes of an SDP-M program, executing on a computing device within the environment of FIG. 9, in accordance with an exemplary embodiment of the present invention.

In process 1350, execute management loop following the flow of FIG. 14.

FIG. 14 illustrates operational processes of an SDP-M program, executing on a computing device within the environment of FIG. 9, in accordance with an exemplary embodiment of the present invention. In one embodiment, a method of controlling, at least in part, a collection of physical devices is implemented using an iterative execution of a management loop is disclosed, with reference to FIG. 14. The processes followed by the management loop are described as follows:

In process 1410, SDP-M 920 runs a management loop over a list of control-nodes/racks, and iterates this process over control-nodes/rack following the specifications of an embodiment. In the is process, SDP-M 920 first selects a live SDP-W 940 (e.g., sdplive) from a data-table included in state-keeper 950 (e.g., sdpmgr.sdpcheckTable) and checks whether a given worker is expired. Then, if SDP-M 920 determined that the SDP-W 940 was expired, then SDP-M 920 adds a new SDP-W 940 for that node using a control-node-lock.

In one such scenario and embodiment, SDP-M 920 first obtains a control-node-lock by: (1) updating the tables in state-keeper 950. For example, SDP-M 920 determines whether fields in a row were used for logging, and/or additional check-purposes, and deletes any rows with expired SDP-W 940 associated (e.g., deleting rows with expired sdplive from sdpcheckTable), (2) SDP-M 920 cleans up the deleted rows. (e.g., by adding a SDP-W 940, for a deleted row, to a SDP clean-up set), (3) SDP-M 920 selects a new SDP-W 940 for the control node (with confirmation it is active and unassigned in state-keeper 950), (4) SDP-M 920 updates controlNodeSdpMap, (5) SDP-M 920 adds a new row to a table of SDP-W 940 in state-keeper 950 (e.g., a new row is added to a sdpcheckTable), (6) SDP-M 920 sends an SDP-application program interface (SDP-API) call to the particular SDP-W 940. Finally, SDP-M 920 releases the control-node-lock. SDP-M 920 then ends the control-node-lock end loop over list of racks.

In process 1420, SDP-M 920 runs a management loop over an SDP-cleanup-set (e.g., over an cleanupSDP set). In some embodiments, SDP-M 920 re-tries the old/failed SDP-W 940 to disengage it from the control node. If that fails, or alternatively, SDP-M 920 signals for a virtual machine cleanup service to end the virtual machine and to start a new virtual machine in its place.

In process 1430, SDP-M 920 checks SDP-W 940 end-points periodically, and updates one or more tables in state-keeper 950 as needed based on the end-points, e.g., updates are made to controlNodeSdpMap that reflect the end-points. In some embodiments, the update to the one or more tables in state-keeper 950 are performed by a single SDP-M 920 and is coordinated through a distributed locking mechanism (may be supported by, for example, state-keeper 950).

In process 1440, SDP-M 920 checks the power control topology periodically (or when alerted of a change) and updates one or more tables in state-keeper 950 to reflect the findings of those checks (e.g., update a controlNodeSdpMap to reflect changes in power control topology). SDP-M 920 maintains a topology sequence number/hash with the power control topology for quick detection of changes to the power control topology. In some embodiments, updates to the one or more tables in state-keeper 950 are performed by a single manager coordinated through a distributed locking mechanism (may be supported by, for example, the state-keeper 950).

Figure 15:
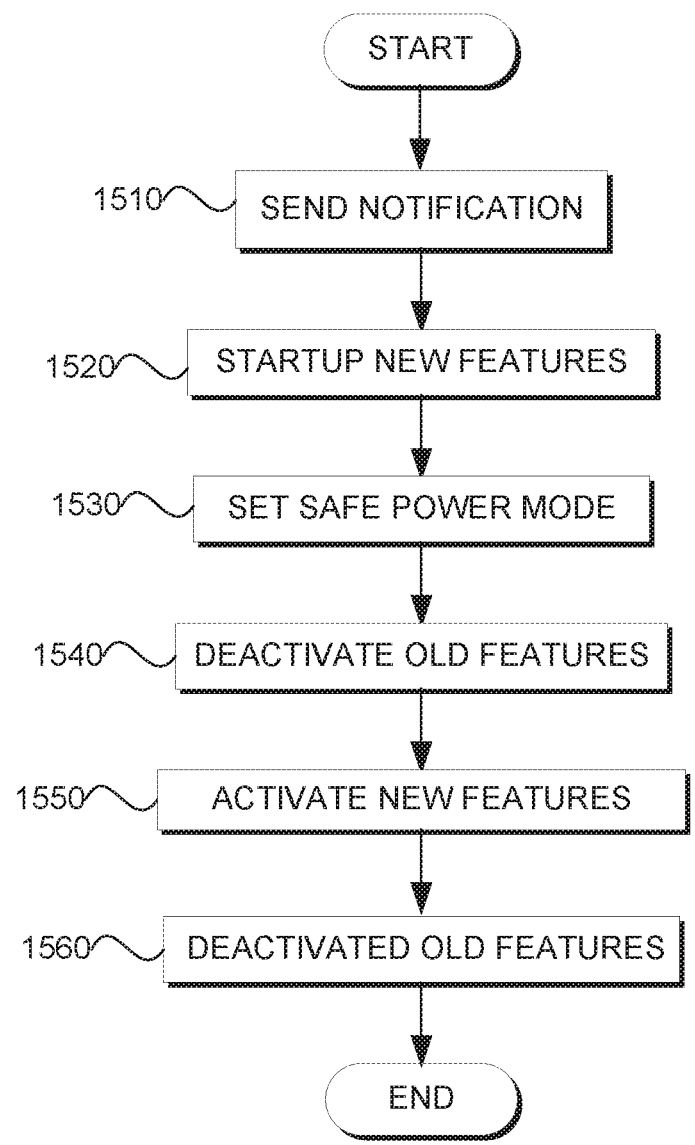
FIG. 15 illustrates operational processes of update program, on a computing device within the environment of FIG. 9, in accordance with an exemplary embodiment of the present invention.

FIG. 15 illustrates operational processes of update program, on a computing device within the environment of FIG. 9, in accordance with an exemplary embodiment of the present invention. In accordance with one embodiment, a method is executed by update program 980 on computing device 902 (as shown in FIG. 9) to perform a live update to activate a new SDP worker and to shut down an already active (old) SDP worker is disclosed, with reference to FIG. 15.

In process 1510, update program 980 sends a "live update notification" to and received respectively by both "old" SDP-M 920 and an "old" SDP-W 940.

In process 1520, update program 980 starts up new features. For example, "new" SDP-W 940 and "new" SDP-M 920 are started in a deactivated state by update program 980.

In process 1530, update program 980 sets a safe power mode. For example, update program 980 sets a safe-power control configuration for nodes that are affected by the loss of the "old" SDP-M 920 and an "old" SDP-W 940.

In process 1540, update program 980 deactivates old features. For example, the "old" SDP-M 920 and an "old" SDP-W 940 are deactivated.

In process 1550, update program 980 activates new features. For example, update program 980 activates "new" SDP-W 940 and "new" SDP-M 920. In this process, "new" SDP-W 940 receives necessary configuration and state information from state-keeper 950 to take charge of the affected nodes, thereby moving those nodes from a "safe state" to a managed state.

In process 1560, update program 980 deactivates the old features. For example, update program 980 deactivates "old" SDP-M 920 and "old" SDP-W 940 are shutdown.

In one live update example: (a) updates are performed to "old" SDP-M 920 (in a fleetman VM), and to SDP-W 940 (in their own VM): including a schema update for shared tables in state-keeper 950. (b) updates are performed to dependent services in other VMs, e.g., service discovery, state-keeper 950, and a locking service.

In one embodiment, live update enabling/support programs support activation and de-activation/shutdown commands for SDP-M 920 and SDP-W 940 service. In one embodiment, live update enabling/support programs use start/stop service commands for SDP-M 920. In one embodiment, live update enabling/support programs can use either explicit switch data base space commands or have them implicit (i.e., hard coded).

In one embodiment, regarding SDP worker to SDP worker communication, no communication is needed between peers in the power distribution hierarchy. However, in such embodiments, communication is still needed and utilized between upper control nodes feeding downstream ones (for example, an SDP worker with an RPP-pair that are upstream from SDP workers for server racks). In one embodiment, regarding SDP worker to SDP worker communication, SDP-W 940 updates state-keeper 950 with demand, constraint, the node (used by upper control node). In one embodiment, SDP-W 940 reads an assigned budget from state-keeper 950 (put into state-keeper 950 by an upper control node). Note that in some scenarios, the disclosed approach is applicable to a non-hierarchical distributed control solutions in addition to hierarchical distributed control solutions.

VI. Priority-Aware Power Capping for Hierarchical Power Distribution Networks

With reference to FIGS. 1-8, mechanisms for priority-aware power capping for hierarchical power distribution networks are provided for implementation as part of certain embodiments of section V. above.

Data centers are facilities used to house computer systems and associated components, such as servers, telecommunication devices, storage systems, or the like. Data centers often treat all of the power consumption devices within as if they are governed by a single power controller. However, power distribution is a hierarchy of transformers, switchgear, distribution panels, and power strips and current power capping solutions fail to take into consideration this power distribution hierarchy and associated characteristics when assigning power caps.

The illustrative embodiments described hereinafter provide mechanisms that allocate data center power to the power consumption devices more efficiently than conventional power capping solutions. The mechanisms provide a unique priority-aware power capping solution that utilizes the power distribution hierarchy and associated characteristics as well as the priority assigned to each power consumption device to throttle the power consumption devices to adhere to design limitations of power distribution equipment or contractual limits. By implementing such a unique priority-aware power capping solution, power performance under normal operating within the data center may be increased thereby allowing more power consumption devices to be added to the data center and improving overall data center performance and revenue. That is, the illustrative embodiments provide a unique priority-aware power capping solution that is no longer just for power failure situations.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104 may be specifically configured to implement a priority-aware power capping mechanisms for hierarchical power distribution networks. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, and software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates priority-aware power capping for hierarchical power distribution networks.

As noted above, the mechanisms of the illustrative embodiments utilize specifically configured computing devices, or data processing systems, to perform the operations for priority-aware power capping for hierarchical power distribution networks. These computing devices, or data processing systems, may comprise various hardware elements, which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the priority-aware power capping mechanism for hierarchical power distribution network.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. In addition, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
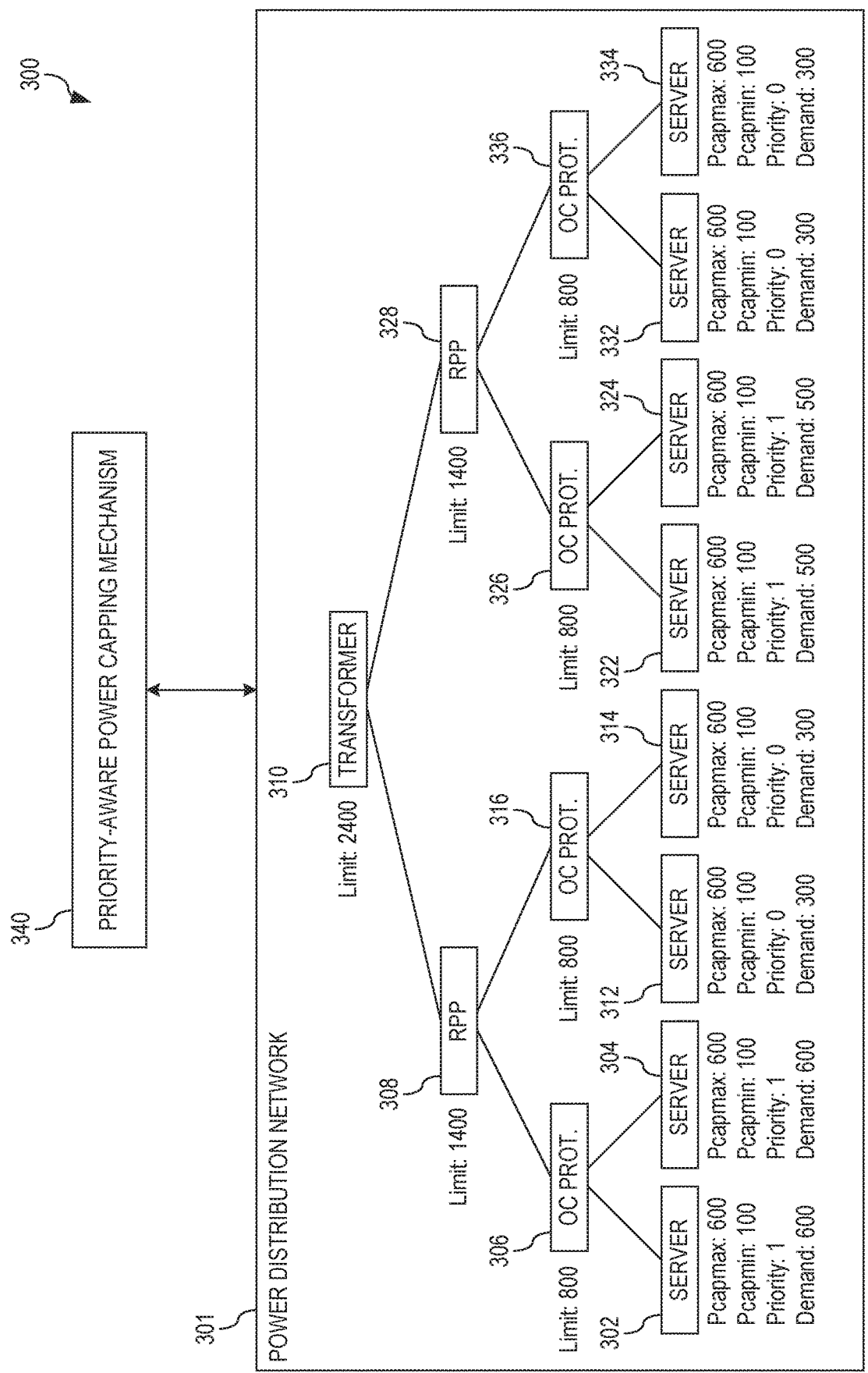
FIG. 3 depicts a functional block diagram of a mechanism for priority-aware power capping for hierarchical power distribution networks in accordance with an illustrative embodiment.

Again, the illustrative embodiments utilize a power distribution hierarchy and associated characteristics of the data center as well as the priority assigned to each power consumption device in the data center to throttle the power consumption devices to adhere to design limitations of power distribution equipment or contractual limits. FIG. 3 depicts a functional block diagram of a mechanism for priority-aware power capping for hierarchical power distribution networks in accordance with an illustrative embodiment. The following description utilizes servers as an exemplary computer system within data center 300; however, utilizes servers is only for the example and the illustrative embodiments recognize that any type of computing resource may be utilized within data center 300, such as servers, telecommunication devices, storage systems, or the like.

As illustrated, data center 300 comprises power distribution network 301 that comprises a set of power consumption devices, i.e. a set of servers 302, 304, 312, 314, 322, 324, 332, and 334. In power distribution network 301, servers 302 and 304 are coupled to overcurrent protection device 306, servers 312 and 314 are coupled to overcurrent protection device 316, servers 322 and 324 are coupled to overcurrent protection device 326, and servers 332 and 334 are coupled to overcurrent protection device 336. As is further illustrated, in power distribution network 301, overcurrent protection devices 306 and 316 are coupled to remote power panel (RPP) 308 and overcurrent protection devices 326 and 336 are coupled to RPP 328. Finally, in power distribution network 301, RPPs 308 and 328 are coupled to transformer 310, which is the main point of entry for electricity into power distribution network 301 of data center 300. While power distribution network 301 is only depicted as comprising a hierarchy of servers, overcurrent protection devices, RPPs, and a transformer, the illustrative embodiments recognize that many other devices may exist in the hierarchy, such as sub-transformers, switchgears, power strips, or the like.

Associated with each device, i.e. each of servers 302, 304, 312, 314, 322, 324, 332, and 334; overcurrent protection devices 306, 316, 326, and 336; RPPs 308 and 328; and transformer 310, are a set of characteristics, such as priority, demand, minimum power cap per priority, maximum power cap per priority, limit, or the like. In normal use, servers 302, 304, 312, 314, 322, 324, 332, and 334 will have an associated priority, demand, minimum power cap per priority, and maximum power cap per priority, while overcurrent protection devices 306, 316, 326, and 336; RPPs 308 and 328; and transformer 310 will have an associated limit. Priority is the assignment associated with the device signifying an importance of the device and may be represented by an integer value, for example from 1 to 10 with 10 being the highest priority and 1 being the lowest priority. Demand refers to the power that the device currently desires to consume without enforcing any power caps. Minimum power cap (Pcapmin) refers to the lowest power cap under which the device may operate. Maximum power cap (Pcapmax) refers to the largest possible power cap under which the device may operate, i.e. the largest possible power consumption of the device. Limit refers to the power limit of a power device.

Figure 4:
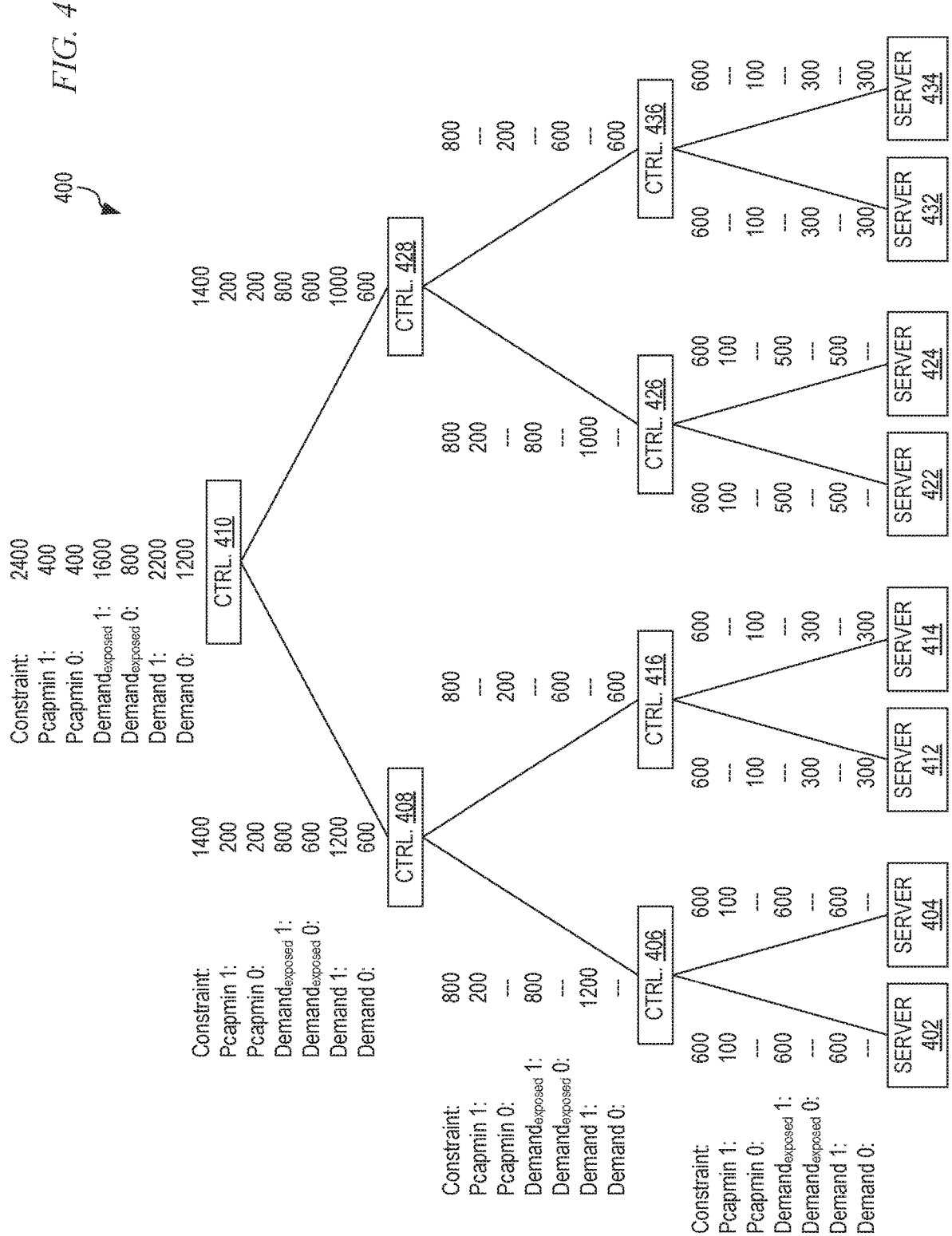
FIG. 4 illustrates determined metrics for each power controller/server in accordance with an illustrative embodiment.

In accordance with the illustrative embodiments, priority-aware power capping mechanism 340 mirrors each power distribution device, i.e. overcurrent protection devices 306, 316, 326, and 336; RPPs 308 and 328; and transformer 310 with a power controller, as is illustrated in FIG. 4 in accordance with an illustrative embodiment. As is depicted in FIG. 4, in power distribution network 400, servers 402, 404, 412, 414, 422, 424, 432, and 434 are power consumption devices that mirror servers 302, 304, 312, 314, 322, 324, 332, and 334 of FIG. 3. As is further depicted in FIG. 4, in power distribution network 400, power controllers 406, 416, 426, and 436 mirror the power distribution devices of overcurrent protection devices 306, 316, 326, and 336 of FIG. 3; power controllers 408 and 428 mirror the power distribution device of RPPs 308 and 328 of FIG. 3; and power controller 410 mirrors the power distribution device of transformer 310 of FIG. 3.

In the illustrative embodiments, in a bottom-up process, priority-aware power capping mechanism 340 summarizes metrics for each server and power controller based on the metrics of any down-stream device(s) and, in a top-down process, assigns power budgets to each power controller/power consumption device based on a determined power budget that takes into consideration the priority of the power consumption devices. Using the characteristics obtained from each of servers 302, 304, 312, 314, 322, 324, 332, and 334; overcurrent protection devices 306, 316, 326, and 336; RPPs 308 and 328; and transformer 310, in the bottom-up process, for each of servers 402, 404, 412, 414, 422, 424, 432, and 434 as well as power controllers 406, 408, 410, 416, 426, 428, and 436, priority-aware power capping mechanism 340 initially summarizes metrics, for example, in Watts, Amps, or the like, for each server/power controllers based on the associated characteristics. These metrics include:

Constraint: The maximum amount of power that is allowed to flow through the power controller/server and the power controllers/servers downwards.

For any priority j of the power controller/server:

Minimum power cap per priority (Pcapmin j): The minimum power budget that the power controller/server requires to receive for the priority.

Exposed power demand per priority (Demand$_{exposed}$ j): The power demand that the power controller/server exposes to its parent power controller for the priority.

Power demand per priority (Demand j): For a power controller, the total power demand that the servers with the priority under the power controller desire to utilize. For a server, the power demand is the power consumption of the server when power capping is not enforced.

With respect to servers 402, 404, 412, 414, 422, 424, 432, and 434, priority-aware power capping mechanism 340 summarizes the metrics for each server using one or more of the following equations as follows:

Constraint=Pcapmax

Pcapmin j=Pcapmin

Demand$_{exposed}$ j=max{Demand,Pcapmin}

Demand j=max{Demand,Pcapmin} where Demand refers to the power that the device currently consumes without enforcing any power caps, Pcapmin refers to the lowest power cap that the device can operate under, Pcapmax refers to the largest possible power cap that the device can operate under, i.e. the maximum power consumption for the server, and j is the instant priority being considered.

In order to provide an example of how these determinations would be conducted, using the exemplary individual characteristics associated with servers 302 and 304 from FIG. 3, for each of servers 402 and 404, priority-aware power capping mechanism 340 would determine:

Constraint=Pcapmax=600

Pcapmin 1=Pcapmin=100

Demand$_{exposed}$ 1=max{Demand,Pcapmin}=max{600, 100}=600

Demand 1=max{Demand,Pcapmin}=max{600, 100}=600.

Using the exemplary individual characteristics associated with servers 312, 314, 332, and 334 from FIG. 3, for each of servers 412, 414, 432, and 434, priority-aware power capping mechanism 340 would determine:

Constraint=Pcapmax=600

Pcapmin 0=Pcapmin=100

Demand$_{exposed}$ 0=max{Demand,Pcapmin}=max{300, 100}=300

Demand 0=max{Demand,Pcapmin}=max{300, 100}=300.

Using the exemplary individual characteristics associated with servers 322 and 324 from FIG. 3, for each of servers 422 and 424, priority-aware power capping mechanism 340 would determine:

Constraint=Pcapmax=600

Pcapmin 1=Pcapmin=100

Demand$_{exposed}$ 1=max{Demand,Pcapmin}=max{500, 100}=500

Demand 1=max{Demand,Pcapmin}=max{500, 100}=500.

Then, with respect to each of power controllers 406, 408, 410, 416, 426, 428, and 436, priority-aware power capping mechanism 340 summarizes the metrics for each power controller using one or more of the following equations as follows:

$$\text{Constraint} = \min\left\{\text{Limit}, \sum_i \text{Constraint } ij\right\}$$

$$\text{Pcapmin } j = \sum_i \text{Pcapmin } ij$$

$$\text{Demand}_{exposed} \ j =$$
$$\min\left\{\text{limit} - \sum_{k<j} \text{Pcapmin } k - \sum_{k>j} \text{Demand}_{exposed} \ k, \sum_i \text{Demand}_{exposed} \ ij\right\}$$

$$\text{Demand } j = \sum_i \text{Demand } ij$$

where i is each child power controller/server below the power controller, j is the instant priority being considered, and k is all other priorities other than priority j being considered.

In order to provide an example of how these determinations would be conducted, using the determinations made for servers 402 and 404 as well as the exemplary individual characteristics associated with overcurrent protection device 306 from FIG. 3, for power controller 406, priority-aware power capping mechanism 340 would determine:

Constraint=min{Limit of power controller 406, Constraint of server 402+Constraint of server 404}=min{800, 600+600}=800

Pcapmin 1=Pcapmin 1 of server 402+Pcapmin 1 of server 404=100+100=200

Demand$_{exposed}$ 1=min{Limit of power controller 406, Demand$_{exposed}$ 1 of server 402+Demand$_{exposed}$ 1 of server 404}=min{800, 600+600}=800

Demand 1=Demand 1 of server 402+Demand 1 of server 404=600+600=1200.

Using the determinations made for servers 412 and 414 as well as the exemplary individual characteristics associated with overcurrent protection device 316 from FIG. 3, for power controller 416, priority-aware power capping mechanism 340 would determine:

Constraint=min{Limit of power controller 416, Constraint of server 412+Constraint of server 414}=min{1800, 600+600}=800

Pcapmin 0=Pcapmin 0 of server 412+Pcapmin 1 of server 414=100+100=200

Demand$_{exposed}$ 0=min{Limit of power controller 416, Demand$_{exposed}$ 0 of server 412+Demand$_{exposed}$ 0 of server 414}=min{1800, 300+300}=600

Demand 0=Demand 0 of server 412+Demand 0 of server 414=300+300=600.

Using the determinations made for servers 422 and 424 as well as the exemplary individual characteristics associated with overcurrent protection device 326 from FIG. 3, for power controller 426, priority-aware power capping mechanism 340 would determine:

Constraint=min{Limit of power controller 426, Constraint of server 422+Constraint of server 424}=min{1800, 600+600}=800

Pcapmin 1=Pcapmin 1 of server 422+Pcapmin 1 of server 424=100+100=200

Demand$_{exposed}$ 1=min{Limit of power controller 426, Demand$_{exposed}$ 1 of server 422+Demand$_{exposed}$ 1 of server 424}=min{1800, 500+500}=800

Demand 1=Demand 1 of server 422+Demand 1 of server 424=500+500=1000.

Using the determinations made for servers 432 and 434 as well as the exemplary individual characteristics associated with overcurrent protection device 336 from FIG. 3, for power controller 436, priority-aware power capping mechanism 340 would determine:

Constraint=min{Limit of power controller 436, Constraint of server 432+Constraint of server 434}=min{1800, 600+600}=800

Pcapmin 0=Pcapmin 0 of server 432+Pcapmin 1 of server 434=100+100=200

Demand$_{exposed}$ 0=min{Limit of power controller 436, Demand$_{exposed}$ 0 of server 432+Demand$_{exposed}$ 0 of server 434}=min{1800, 300+300}=600

Demand 0=Demand 0 of server 432+Demand 0 of server 434=300+300=600.

Using the determinations made for power controllers 406 and 416 as well as the exemplary individual characteristics associated with RPP 308 from FIG. 3, for power controller 408, priority-aware power capping mechanism 340 would determine:

Constraint=min{Limit of power controller 408, Constraint of power controller 406+Constraint of power controller 416}=min{1400, 800+800}=1400

Pcapmin 1=Pcapmin 1 of power controller 406=200

Pcapmin 0=Pcapmin 0 of power controller 416=200

Demand$_{exposed}$ 1=min{Limit of power controller 408−Pcapmin 0 of power controller 408, Demand$_{exposed}$ 1 of power controller 406}=min{1400−200, 800}=800

Demand$_{exposed}$ 0=min{Limit of power controller 408−Demand$_{exposed}$ 1 of power controller 408, Demand$_{exposed}$ 0 of power controller 416}=min{1400−800, 600}=600

Demand 1=Demand 1 of power controller 406=1200

Demand 0=Demand 0 of power controller 416=600.

Using the determinations made for power controllers 426 and 436 as well as the exemplary individual characteristics associated with RPP 328 from FIG. 3, for power controller 428, priority-aware power capping mechanism 340 would determine:

Constraint=min{Limit of power controller 428, Constraint of power controller 426+Constraint of power controller 436}=min{1400, 800+800}=1400

$P$capmin 1=$P$capmin 1 of power controller 426=200

$P$capmin 0=$P$capmin 0 of power controller 436=200

Demand$_{exposed}$ 1=min{Limit of power controller 428−$P$capmin 0 of power controller 428, Demand$_{exposed}$ 1 of power controller 426}=min{1400−200, 800}=800

Demand$_{exposed}$ 0=min{Limit of power controller 428−Demand$_{exposed}$ 1 of power controller 428, Demand$_{exposed}$ 0 of power controller 436}=min{1400−800, 600}=600

Demand 1=Demand 1 of power controller 426=1000

Demand 0=Demand 0 of power controller 436=600.

Using the determinations made for power controllers 408 and 428 as well as the exemplary individual characteristics associated with transformer 310 from FIG. 3, for power controller 410, priority-aware power capping mechanism 340 would determine:

Constraint=min{Limit of power controller 410, Constraint of power controller 408+Constraint of power controller 428}=min{2400, 1400+1400}=2400

$P$capmin 1=$P$capmin 1 of power controller 408+$P$capmin 1 of power controller 428=200+200=400

$P$capmin 0=$P$capmin 0 of power controller 408+$P$capmin 0 of power controller 428=200+200=400

Demand$_{exposed}$ 1=min{Limit of power controller 410−$P$capmin 0 of power controller 410, Demand$_{exposed}$ 1 of power controller 408+Demand$_{exposed}$ 1 of power controller 428}=min{2400−400, 800+800}=1600

Demand$_{exposed}$ 0=min{Limit of power controller 410−Demand$_{exposed}$ 1 of power controller 410, Demand$_{exposed}$ 0 of power controller 408=Demand$_{exposed}$ 0 of power controller 428}=min{2400−1600, 600+600}=800

Demand 1=Demand 1 of power controller 408+Demand 1 of power controller 428=1200+1000=2200

Demand 0=Demand 0 of power controller 408+Demand 0 of power controller 428=600+600=1200.

With priority-aware power capping mechanism 340 determining the metrics for each of servers 402, 404, 412, 414, 422, 424, 432, and 434 as well as power controllers 406, 408, 410, 416, 426, 428, and 436 in the bottom-up process, priority-aware power capping mechanism 340 turns to the top-down process of assigning power budgets to each power controllers and eventually the power consumption devices for use as a throttling value when certain conditions are met based on a determined power budget. For each power controller 406, 408, 410, 416, 426, 428, and 436, priority-aware power capping mechanism 340 performs a three-step operation to determine the power budget assigned child power controllers/servers:

Assign minimum power budget by assigning the determined priority $P$capmin j to each child based on the child's priority.

Assign demanded power budget by, from high priority to low priority, at each priority. If the remaining power budget is enough to satisfy the remaining Demand$_{exposed}$ j of the priority, further assign each child its remaining Demand$_{exposed}$ j of the priority. If the remaining power budget fails to be enough to satisfy the remaining Demand$_{exposed}$ j of the priority, priority-aware power capping mechanism 340 utilizes a supplemental algorithm to break up the remaining power budget to each child, with the condition that each priority of each child does not receive a total power budget that exceeds its Demand$_{exposed}$ j of the priority. The supplemental algorithm may be, for example, an equal proportion algorithm, a high-demand cut-first algorithm, or the like. Equal proportion assigns a same percentage to all children nodes of their (remaining) demanded power (i.e. the amount of demand beyond $P$capmin) when the full demand cannot be satisfied. High-demand cut-first removes budget from the highest power consuming children nodes until they match lower power consuming children nodes, which is repeated until the power budget is acceptable.

If the remaining power budget is enough to satisfy the remaining Demand$_{exposed}$ j of the priority and there remains unassigned power from the power budget, assign the remaining unassigned power budget to each child, with the condition that each child does not receive a total power budget that exceeds its constraint using a supplemental algorithm, such as for example, an equal proportion algorithm, a high-demand cut-first algorithm, or the like.

Figure 5:
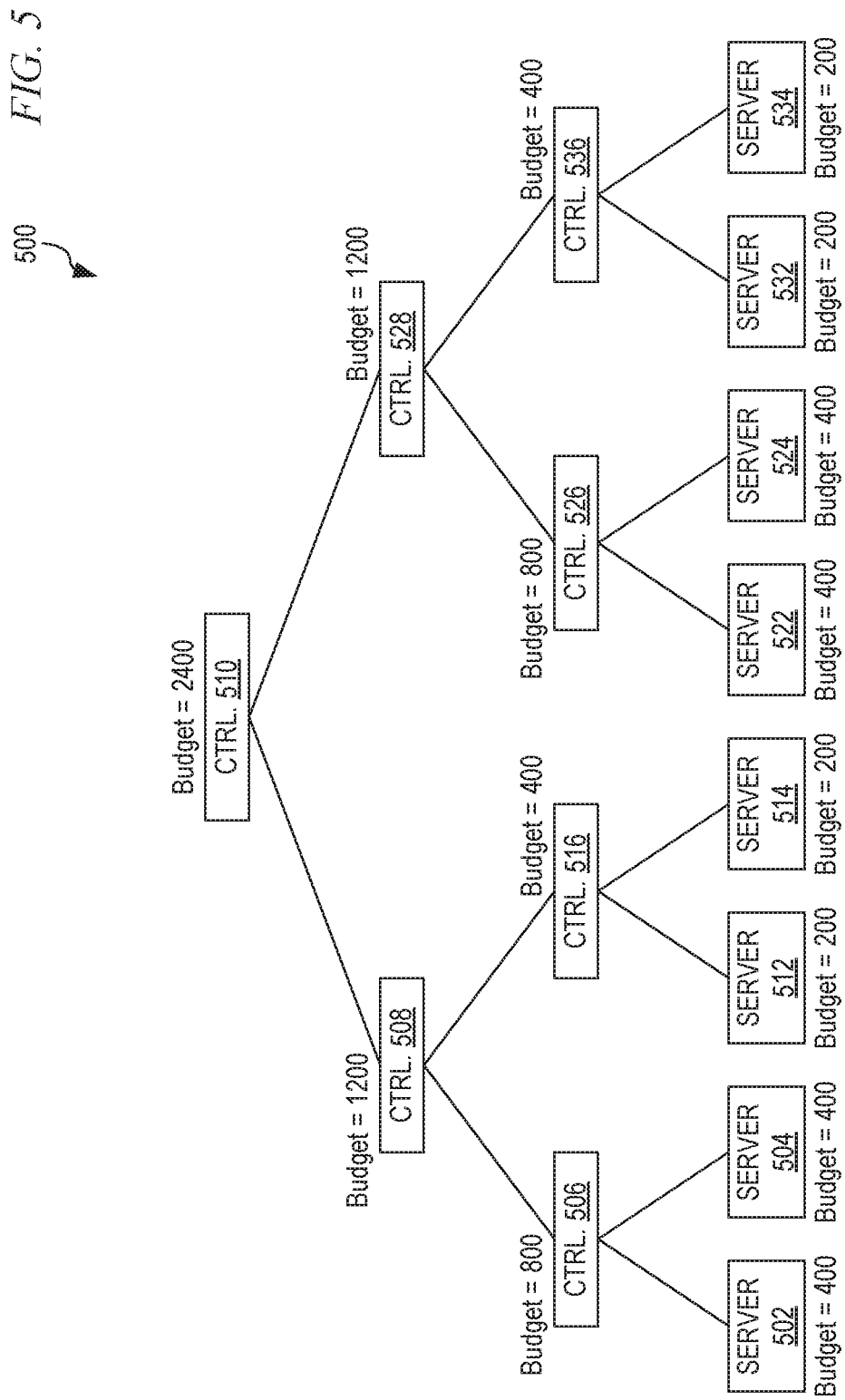
FIG. 5 illustrates assigned power budgets to each power controller/server in accordance with an illustrative embodiment.

Following these procedures, priority-aware power capping mechanism 340 determines the power budgets to each power controller/server, as is illustrated in FIG. 5 in accordance with an illustrative embodiment. As with FIG. 4, power distribution network 500 of FIG. 5 comprises servers 502, 504, 512, 514, 522, 524, 532, and 534 that are power consumption devices that mirror servers 302, 304, 312, 314, 322, 324, 332, and 334 of FIG. 3 as well as power controllers 506, 516, 526, and 536 that mirror the power distribution devices of overcurrent protection devices 306, 316, 326, and 336 of FIG. 3; power controllers 508 and 528 that mirror the power distribution device of RPPs 308 and 328 of FIG. 3; and power controller 510 that mirrors the power distribution device of transformer 310 of FIG. 3. In the example, an equal proportion algorithm is used as the supplemental algorithm, which distributes power proportionally to each child. In detail, for step 2, each child receives a power budget proportionally to the difference of its Demand j and $P$capmin j of the priority. Then for step 3, each child receives a power budget proportionally to the difference of its total Demand j and total $P$capmin j for all its priorities.

For example, using the exemplary metrics identified in FIG. 4 and the three-step operation identified above for power controller 510, priority-aware power capping mechanism 340 would determine:

|  | | Budget of power controller 508 | | Budget of power controller 528 | |
|---|---|---|---|---|---|
|  | Remaining Budget | Priority 1 | Priority 0 | Priority 1 | Priority 0 |
| Step 1 | 2400 | 200 | 200 | 200 | 200 |
| Step 2 | 2400 − 200 − 200 − 200 − 200 = 1600 | 800 − 200 = 600 | (1600 − 600 − 600)*((600 − 200)/((600 − 200) + (600 − 200)) = 200 | 800 − 200 = 600 | (1600 − 600 − 600)*((600 − 200)/((600 − 200) + (600 − 200)) = 200 |
| Step 3 | 1600 − 600 − 200 − 600 − 200 = 0 | 0 | 0 | 0 | 0 |
| Total | 0 | | 200 + 200 + 600 + 200 + 0 + 0 = 1200 | | 200 + 200 + 600 + 200 + 0 + 0 = 1200 |

Using the exemplary metrics identified in FIG. 4 and the three operations identified above for power controller 508, priority-aware power capping mechanism 340 would determine:

|  | | Budget of power controller 506 | | Budget of power controller 516 | |
|---|---|---|---|---|---|
|  | Remaining Budget | Priority 1 | Priority 0 | Priority 1 | Priority 0 |
| Step 1 | 1200 | 200 | — | — | 200 |
| Step 2 | 1200 − 200 − 200 = 800 | 800 − 200 = 600 | — | — | 800 − 600 = 200 |
| Step 3 | 800 − 600 − 200 = 0 | 0 | — | — | 0 |
| Total | 0 | 200 + 600 + 0 = 800 | | | 200 + 200 + 0 = 400 |

Using the exemplary metrics identified in FIG. 4 and the three operations identified above for power controller 528, priority-aware power capping mechanism 340 would determine:

|  | | Budget of power controller 526 | | Budget of power controller 536 | |
|---|---|---|---|---|---|
|  | Remaining Budget | Priority 1 | Priority 0 | Priority 1 | Priority 0 |
| Step 1 | 1200 | 200 | — | — | 200 |
| Step 2 | 1200 − 200 − 200 = 800 | 800 − 200 = 600 | — | — | 800 − 600 = 200 |
| Step 3 | 800 − 600 − 200 = 0 | 0 | — | — | 0 |
| Total | 0 | 200 + 600 + 0 = 800 | | | 200 + 200 + 0 = 400 |

Using the exemplary metrics identified in FIG. 4 and the three operations identified above for power controller 506, priority-aware power capping mechanism 340 would determine:

|  | | Budget of Server 502 | | Budget of Server 504 | |
|---|---|---|---|---|---|
|  | Remaining Budget | Priority 1 | Priority 0 | Priority 1 | Priority 0 |
| Step 1 | 800 | 100 | — | 100 | — |
| Step 2 | 800 − 100 − 100 = 600 | 600*((600 − 100)/((600 − 100) + (600 − 100)) = 300 | — | 600*((600 − 100)/((600 − 100) + (600 − 100)) = 300 | — |
| Step 3 | 600 − 300 − 300 = 0 | 0 | — | 0 | — |
| Total | 0 | 100 + 300 + 0 = 400 | | 100 + 300 + 0 = 400 | |

Using the exemplary metrics identified in FIG. 4 and the three operations identified above for power controller 516, priority-aware power capping mechanism 340 would determine:

|  | | Budget of Server 512 | | Budget of Server 514 | |
|---|---|---|---|---|---|
|  | Remaining Budget | Priority 1 | Priority 0 | Priority 1 | Priority 0 |
| Step 1 | 400 | — | 100 | — | 100 |
| Step 2 | 400 − 100 − 100 = 200 | — | 200*((300 − 100)/((300 − 100) + (300 − 100)) = 100 | — | 200*((300 − 100)/((300 − 100) + (300 − 100)) = 100 |
| Step 3 | 200 − 100 − 100 = 0 | — | 0 | — | 0 |
| Total | 0 | | 100 + 100 + 0 = 200 | | 100 + 100 + 0 = 200 |

Using the exemplary metrics identified in FIG. 4 and the three operations identified above for power controller 526, priority-aware power capping mechanism 340 would determine:

|  | | Budget of Server 522 | | Budget of Server 524 | |
|---|---|---|---|---|---|
|  | Remaining Budget | Priority 1 | Priority 0 | Priority 1 | Priority 0 |
| Step 1 | 800 | 100 | — | 100 | — |
| Step 2 | 800 − 100 − 100 = 600 | 600*((500 − 100)/((500 − 100) + (500 − 100)) = 300 | — | 600*((500 − 100)/((500 − 100) + (500 − 100)) = 300 | — |
| Step 3 | 600 − 300 − 300 = 0 | 0 | — | 0 | — |
| Total | 0 | 100 + 300 + 0 = 400 | | 100 + 300 + 0 = 400 | |

Using the exemplary metrics identified in FIG. 4 and the three operations identified above for power controller 526, priority-aware power capping mechanism 340 would determine:

| | | Budget of Server 532 | | Budget of Server 534 | |
|---|---|---|---|---|---|
| | Remaining Budget | Priority 1 | Priority 0 | Priority 1 | Priority 0 |
| Step 1 | 400 | — | 100 | — | 100 |
| Step 2 | 400 − 100 − 100 = 200 | — | 200*((300 − 100)/((300 − 100) + (300 − 100))) = 100 | — | 200*((300 − 100)/((300 − 100) + (300 − 100))) = 100 |
| Step 3 | 200 − 100 − 100 = 0 | — | 0 | — | 0 |
| Total | 0 | | 100 + 100 + 0 = 200 | | 100 + 100 + 0 = 200 |

Using the unique priority-aware power capping solution as is illustrated in FIG. 3-5 that utilizes the power distribution hierarchy and associated characteristics as well as the priority assigned to each power consumption device, the power budgets associated to each of servers 302, 304, 312, 314, 322, 324, 332, and 334 by priority-aware power capping mechanism 340 causes each of servers 302, 304, 312, 314, 322, 324, 332, and 334 to implement one or more throttling mechanisms, such as dynamic voltage/frequency scaling, clock modulation, or the like, to adhere to design limitations of power distribution equipment or contractual limits. For example, throttling may occur when some or all power consumption devices reach: the power limits of power distribution devices in the power distribution network, the total power budget for the data center, or the like. By implementing such a unique priority-aware power capping solution, power performance under normal operating within the data center may be increased by 39% thereby allowing for 39% more power consumption devices to be added to the data center and improving overall data center performance and revenue. That is, the illustrative embodiments provide a unique priority-aware power capping solution that is no longer just for power failure situations.

Thus, the illustrative embodiments are intended to operate on a periodic interval so that the mechanisms are responsive to power load changes on the servers, priority changes of the servers, and loss of available power supply in the network from contractual changes or equipment failure. The illustrative embodiments may also be recomputed upon changes to the inputs (priority, demand power, or the like).

It is understood that power supplying devices are typically designed to be operated safely in overload conditions by design for short time intervals. The periodic time interval of the illustrative embodiments is intended to be much smaller than the time for the overcurrent protection devices to trip, or the time period at which power supplying devices may operate in an overload condition. Therefore, the illustrative embodiments will safely operate the data center even in the event of quick power consumption ramp rates.

It is further understood that lower levels of the hierarchy may compute at different (e.g. faster) time intervals than the higher levels. In this way, the lower level may be immediately responsive to power load changes and priority changes while operating within a budget provided from a higher level.

The illustrative embodiments may incorporate power consuming devices without a power capping feature by defining for them Pcapmin=Pcapmax=exposed demand power=demand power>expected power consumption and given a priority class higher than all power capping devices. This allows power capping and non-power capping devices to co-exist on a shared power distribution branch.

Figure 6:
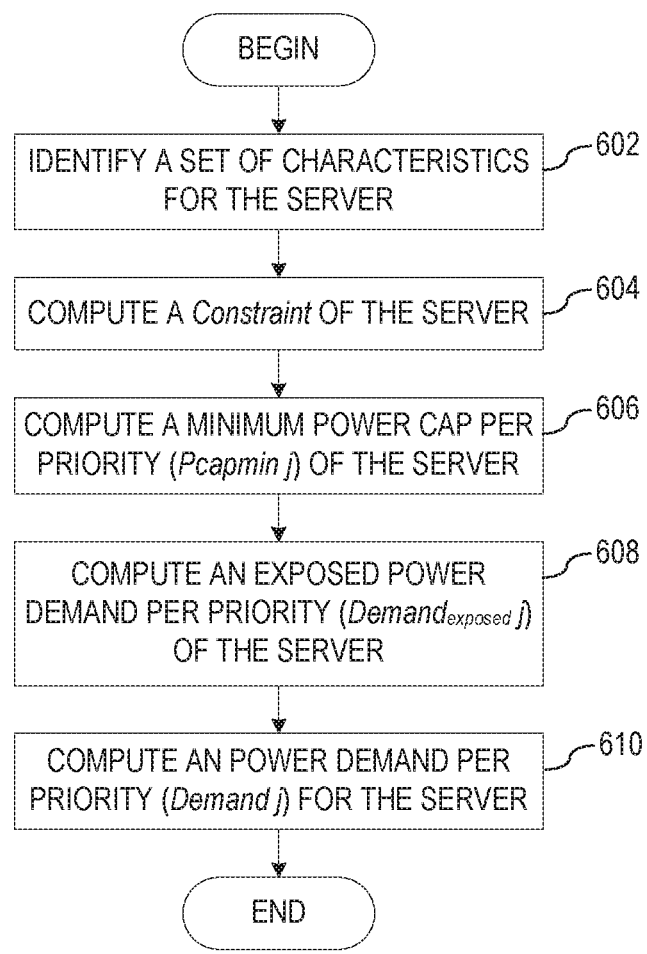
FIG. 6 depicts a flow diagram of the operation performed by a priority-aware power capping mechanism in determining a set of metrics for a server, i.e. a power consumption device, in a data center in accordance with an illustrative embodiment.

FIG. 6 depicts a flow diagram of the operation performed by a priority-aware power capping mechanism in determining a set of metrics for a server, i.e. a power consumption device, in a data center in accordance with an illustrative embodiment. As the operation begins, the priority-aware power capping mechanism identifies a set of characteristics for the server (step 602) including a Demand that refers to the power that the server currently desires to consume without enforcing any power caps, a Pcapmin that refers to the lowest power cap that the server can operate under, a Pcapmax that refers to the largest possible power cap that the server can operate under, and a priority j that is the instant priority of the server. The priority-aware power capping mechanism then computes a Constraint of the server (step 604) that is a maximum amount of power that is allowed to flow through server using the following formula:

Constraint=$P$capmax.

The priority-aware power capping mechanism then computes a minimum power cap per priority (Pcapmin j) of the server (step 606) that is minimum power budget that the server requires to receive for the assigned priority using the following formula:

$P$capmin $j$=$P$capmin.

The priority-aware power capping mechanism then computes an exposed power demand per priority (Demand$_{exposed}$ j) of the server (step 608) that is the power demand that the server exposes to its parent power controller for the assigned priority using the following formula:

Demand$_{exposed}$ $j$=max{Demand,$P$capmin}.

The priority-aware power capping mechanism then computes a power demand per priority (Demand j) for the server (step 610) that is the power demand that the server desires to utilize using the following formula:

Demand $j$=max{Demand,$P$capmin}.

The operation ends thereafter.

Figure 7:
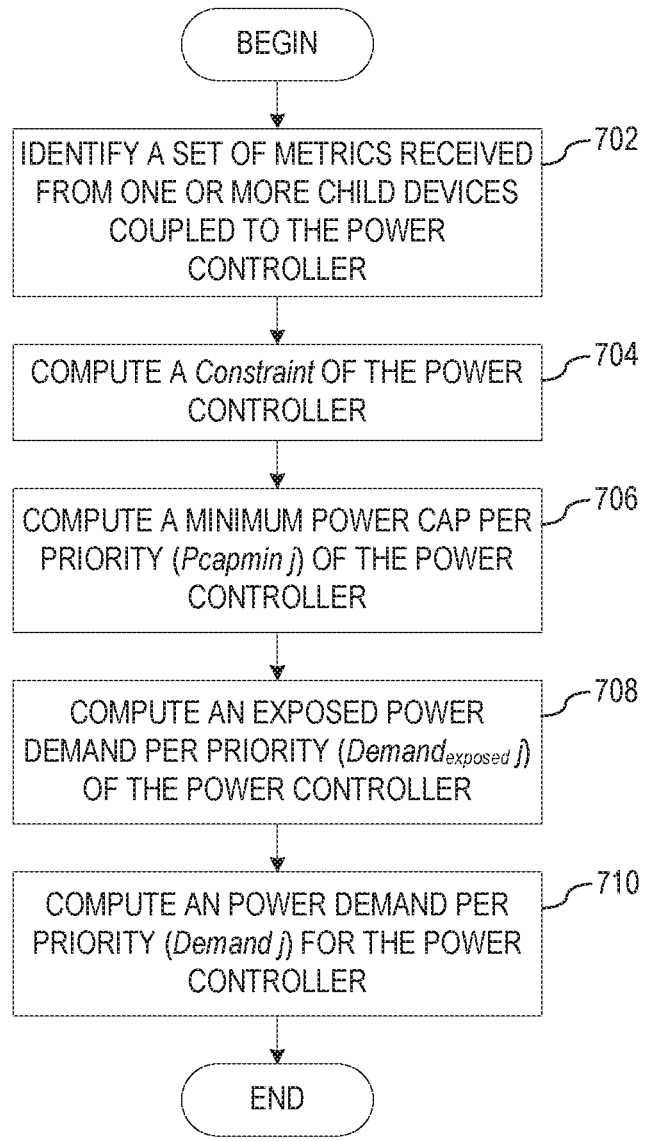
FIG. 7 depicts a flow diagram of the operation performed by a priority-aware power capping mechanism in determining a set of metrics for a power controller, i.e. a power distribution device, in a data center in accordance with an illustrative embodiment.

FIG. 7 depicts a flow diagram of the operation performed by a priority-aware power capping mechanism in determining a set of metrics for a power controller, i.e. a power distribution device, in a data center in accordance with an illustrative embodiment. As the operation begins, the priority-aware power capping mechanism identifies a set of metrics received from one or more child devices coupled to the power controller (step 702). Using this set of metrics, the priority-aware power capping mechanism computes a Constraint of the power controller (step 704) that is a maximum amount of power that is allowed to flow through power controller using the following formula:

$$\text{Constraint} = \min\left\{\text{Limit}, \sum_i \text{Constraint } ij\right\}.$$

The priority-aware power capping mechanism then computes a minimum power cap per priority (Pcapmin j) of the power controller (step 706) that is minimum power budget that the power controller requires to receive for the assigned priority using the following formula:

$$Pcapmin\ j = \sum_i Pcapmin\ ij.$$

The priority-aware power capping mechanism then computes an exposed power demand per priority (Demand$_{exposed}$ j) of the power controller (step 708) that is the power demand that the power controller exposes to its parent power controller for the assigned priority using the following formula:

$$\text{Demand}_{exposed}\ j =$$
$$\min\left\{\text{limit} - \sum_{k<j} \text{Pcapmin}\ k - \sum_{k>j} \text{Demand}_{exposed}\ k, \sum_{i} \text{Demand}_{exposed}\ ij\right\}.$$

The priority-aware power capping mechanism then computes a power demand per priority (Demand j) for the power controller (step 710) that is the power demand that the power controller desires to utilize using the following formula:

$$\text{Demand}\ j = \sum_{i} \text{Demand}\ ij.$$

Throughout the operations of FIG. 7, i is each child power controller/server below the power controller, j is the instant priority being considered, and k is all other priorities other than priority j being considered. The operation ends thereafter.

Figure 8:
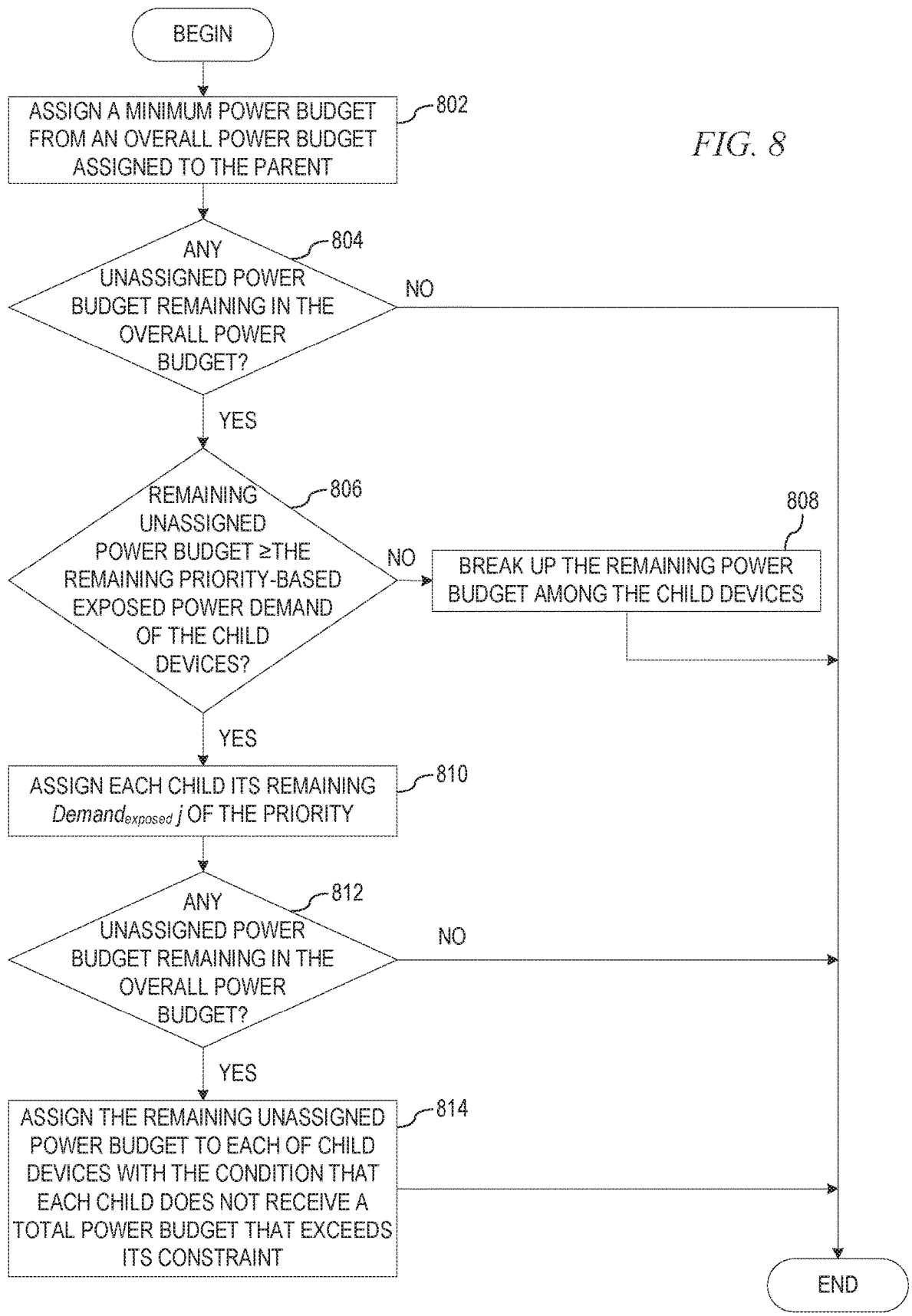
FIG. 8 depicts a flow diagram of the operation performed by a priority-aware power capping mechanism in assigning power budgets to each power controller and eventually to each power consumption device for use as a throttling value when certain conditions are met based on a determined power budget in accordance with an illustrative embodiment.

FIG. 8 depicts a flow diagram of the operation performed by a priority-aware power capping mechanism in assigning power budgets to each power controller and eventually to each power consumption device for use as a throttling value when certain conditions are met based on a determined power budget in accordance with an illustrative embodiment. As the operation begins, for each child device in a set of child device of a parent working from highest to lowest priority, the priority-aware power capping mechanism assigns a minimum power budget, from an overall power budget assigned to the parent, by assigning the determined priority Pcapmin j to each child based on the child's priority (step 802). The priority-aware power capping mechanism determines whether there is any unassigned power budget remaining in the overall power budget (step 804). If at step 804 there is no unassigned power budget remaining in the overall power budget, the operation ends. If at step 804 there is unassigned power budget remaining in the overall power budget, the priority-aware power capping mechanism determines whether the remaining unassigned power budget is greater than or equal to the remaining priority-based exposed power demand value of the child devices (step 806).

If at step 806 the remaining unassigned power budget is less than the remaining priority-based exposed power demand value of the child devices, the priority-aware power capping mechanism utilizes a supplemental algorithm to break up the remaining power budget among the child devices (step 808), with the condition that each priority of each child does not receive a total power budget that exceeds its Demand$_{exposed}$ j of the priority. The supplemental algorithm may be, for example, an equal proportion algorithm, a high-demand cut-first algorithm, or the like. The operation ends thereafter. If at step 806 the remaining unassigned power budget is greater than or equal to the remaining priority-based exposed power demand value, the priority-aware power capping mechanism assigns each child its remaining Demand$_{exposed\ j}$ of the priority (step 810).

The priority-aware power capping mechanism then determines whether there is any unassigned power budget remaining in the overall power budget (step 812). If at step 812 there is no unassigned power budget remaining in the overall power budget, the operation ends. If at step 812 there is unassigned power budget remaining in the overall power budget, the priority-aware power capping mechanism assigns the remaining unassigned power budget to each of child devices (step 814) with the condition that each child does not receive a total power budget that exceeds its constraint using a supplemental algorithm, such as for example, an equal proportion algorithm, a high-demand cut-first algorithm, or the like. The operation ends thereafter.

VII. Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.
Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).
Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 16:
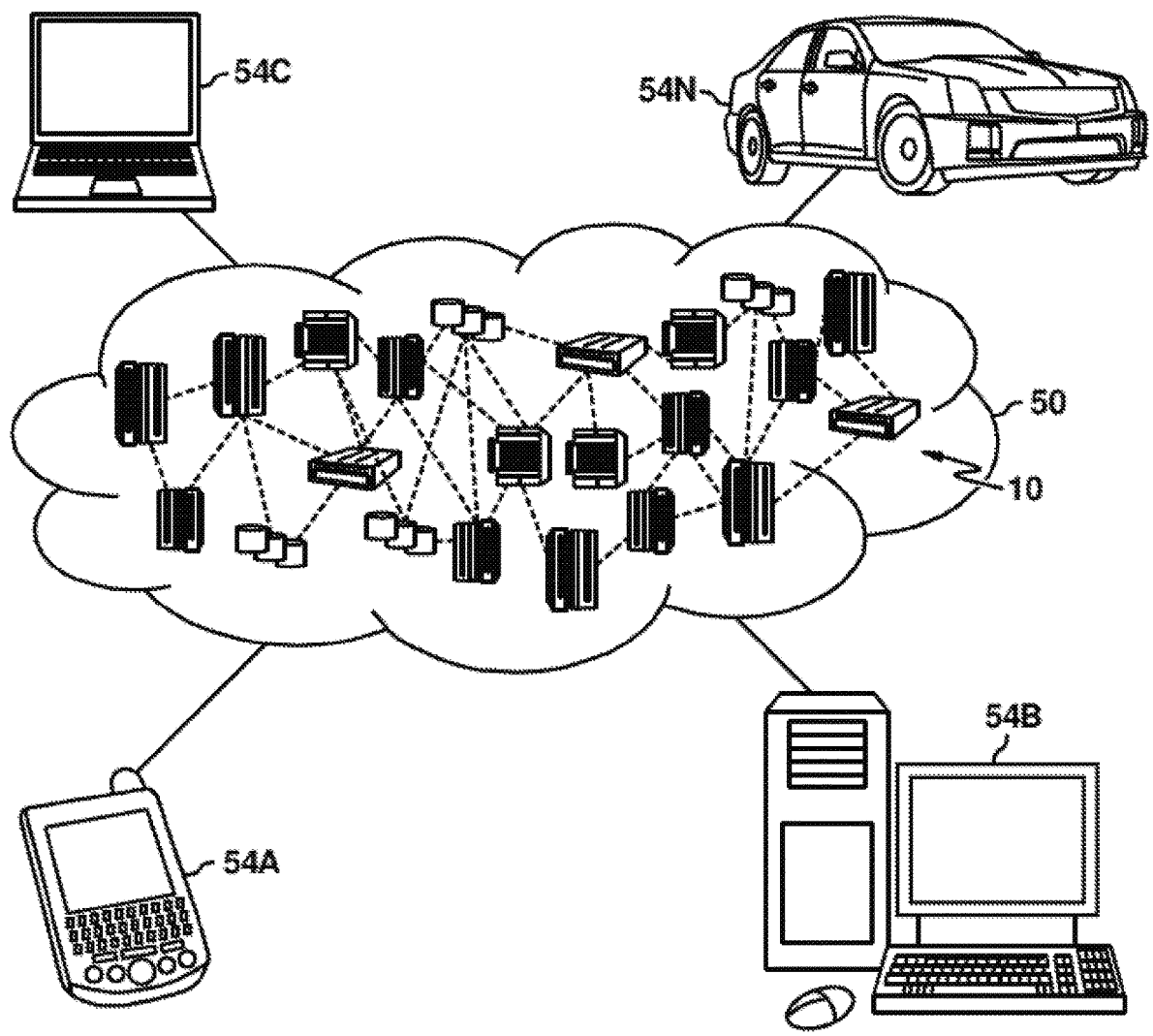
FIG. 16 depicts a cloud computing environment, in accordance with an exemplary embodiment of the present invention.

Referring now to FIG. 16, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 17:
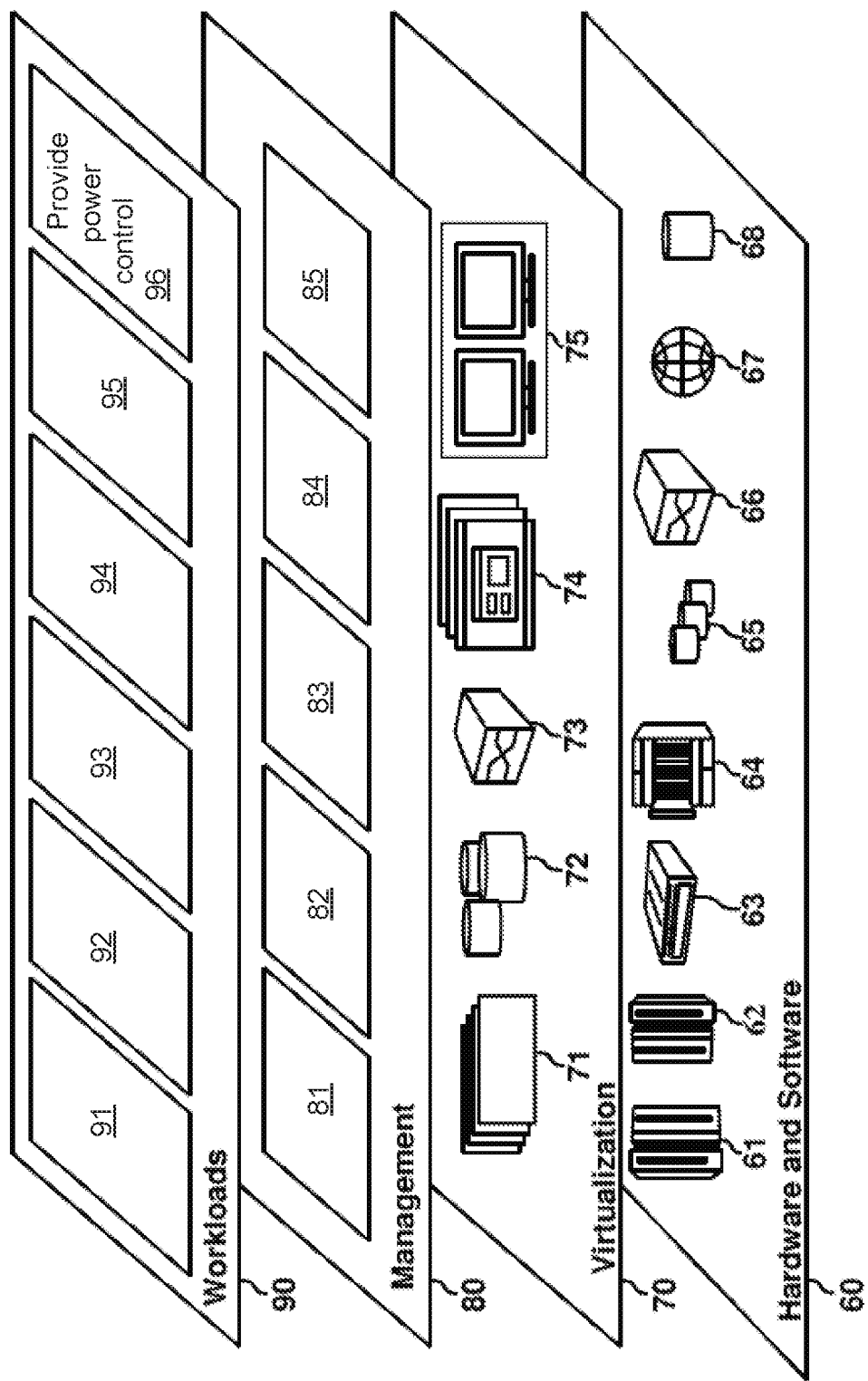
FIG. 17 depicts abstraction model layers, in accordance with an exemplary embodiment of the present invention.

Referring now to FIG. 17, a set of functional abstraction layers provided by cloud computing environment 50 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing power control 96. For example, in one embodiment, providing power control 96 includes and/or provides at least some of the program components, processes, and features, as described herein, with reference to FIGS. 1-15.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for allocating data center power to the power consumption devices. The mechanisms provide a unique priority-aware power capping solution that utilizes the power distribution hierarchy and associated characteristics as well as the priority assigned to each power consumption device to throttle the power consumption devices to adhere to design limitations of power distribution equipment or contractual limits. That is, every server receives its assigned power budget and enforce the power budget based on a condition being met, so that all the power limits in the data center will be respected. The illustrative embodiments capture the notion of priority by letting the servers with high priority receive a power budget such that they are throttled as less as possible before setting the power budgets to servers with low priority.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A method of controlling power distribution, the method comprising:
    determining, by one or more computer processors, a topography for a power delivery system that powers a group of computing devices;
    determining, by the one or more computer processors, a number of worker programs for a pool of worker programs based, at least in part, on the topography;
    generating, by the one or more computer processors, the pool of worker programs, wherein the pool of worker programs includes (i) the number of worker programs and (ii) a number of back-up worker programs;
    generating, by the one or more computer processors, a number of power management tasks to manage power consumption through one or more power elements included in the topography of the power delivery system; and
    sending, by the one or more computer processors, one or more of the number of power management tasks to a worker program included in the pool of worker programs.

2. The method of claim 1, the method further comprising:
    responsive to a determination that a given worker program assigned to the power element did not complete the one or more power management tasks within a predetermined time period, by (i) removing, by the one or more computer processors, assignment of the power element from the given worker program, and (ii) reassigning, by the one or more computer processors, the power element to a different worker program included in the pool of worker programs.

3. The method of claim 1, wherein manager programs monitor one or more of: (i) a state of a given worker program, (ii) progress in completion of a given control task by the given worker program, (iii) one or both of addition and deletion of power elements from the power delivery system, (iv) for non-completion of tasks by the given worker program within a predetermined time, and wherein manager programs control one or both of (i) assignment of new tasks to worker programs and (ii) re-assignment of tasks from one worker program to another worker program.

4. The method of claim 1, wherein respective actions of worker programs and manager programs are coordinated through the use of one or both of highly available locking services and database services.

5. The method of claim 1, wherein a given worker program responds to an error condition that persisted for more than a period of time by modifying one or both of a power allocation and a control of a power element, based, at least in part, on one or more safe states that are configured to ensure the power delivery system continues to be managed in accordance with a power budget, and wherein one or both of power allocation and control of the power element is managed by the given worker program through at least one assigned control task.

6. The method of claim 1, wherein a parent-worker program responds to a break in a monitoring ability of a given child-worker program for a subset of power elements assigned to the given child-worker program by a control task, by using one or both of (i) an alternate measurement for at least one of power consumption and load, and (ii) a pre-determined safe consumption value for at least one of a power consumption and a load of a computing device as a substitute, at least in part, for missing sensor data regarding the subset of power elements.

7. The method of claim 1, the method further comprising:
identifying, by the one or more computer processors, a change that has occurred with respect to one or more of (i) an amount of power available to the power delivery system, (ii) the topography for the power delivery system, and (iii) the group of computing devices;
determining, by the one or more computer processors, that the change meets a criteria for alteration of a power management policy for one or both of the power delivery system and the group of computing devices; and
based, at least in part, on the change, modifying, by the one or more computer processors, at least one of (ii) an assignment of one or more worker programs of the pool of worker programs and (iii) a processing of one or more tasks by one or more worker programs of the pool of worker programs.

8. The method of claim 7, the method further comprising:
responsive to meeting one or more criteria for alteration of a power management policy, initiating, by the one or more computer processors, the generation of a new power management task for a given power element of the one or more power elements based, at least in part on the change.

9. The method of claim 1, wherein assignment of (i) managing power elements to tasks and (ii) tasks to workers is determined based on a set of rules that account for trade-offs between one or more of: (i) a required controlled action responsiveness, (ii) a resource needed to monitor power elements and control power consumption, (iii) a consistency of power allocation associated with a plurality of power elements in the topography, (iv) an availability, as a whole, of a power control system that controls at least a part of the power delivery system, and (v) a failing subset of worker programs.

10. A computer program product for controlling power distribution, the computer program product comprising:
one or more computer-readable storage media and program instructions stored on the one or more computer-readable storage media, the program instructions comprising:
program instructions to determine a topography for a power delivery system that powers a group of computing devices;
program instructions to determine a number of worker programs for a pool of worker programs based, at least in part, on the topography;
program instructions to generate the pool of worker programs, wherein the pool of worker programs includes (i) the number of worker programs and (ii) a number of back-up worker programs;
program instructions to generate a number of power management tasks to manage power consumption through one or more power elements included in the topography of the power delivery system; and
program instructions to send one or more of the number of power management tasks to a worker program included in the pool of worker programs.

11. The computer program product of claim 10, the program instructions further comprising:
program instructions to respond to a determination that a given worker program assigned to the power element did not complete the one or more power management tasks within a predetermined time period, by (i) removing assignment of the power element from the given worker program, and (ii) reassigning the power element to a different worker program included in the pool of worker programs.

12. The computer program product of claim 10, wherein manager programs monitor one or more of: (i) a state of a given worker program, (ii) progress in completion of a given control task by the given worker program, (iii) one or both of addition and deletion of power elements from the power delivery system, (iv) for non-completion of tasks by the given worker program within a predetermined time, and wherein manager programs control one or both of (i) assignment of new tasks to worker programs and (ii) re-assignment of tasks from one worker program to another worker program.

13. The computer program product of claim 10, wherein respective actions of worker programs and manager programs are coordinated through the use of one or both of highly available locking services and database services.

14. The computer program product of claim 10, wherein a given worker program responds to an error condition that persisted for more than a period of time by modifying one or both of a power allocation and a control of a power element, based, at least in part, on one or more safe states that are configured to ensure the power delivery system continues to be managed in accordance with a power budget, and wherein one or both of power allocation and control of the power element is managed by the given worker program through at least one assigned control task.

15. The computer program product of claim 10, wherein a parent-worker program responds to a break in a monitoring ability of a given child-worker program for a subset of power elements assigned to the given child-worker program by a control task, by using one or both of (i) an alternate measurement for at least one of power consumption and load, and (ii) a pre-determined safe consumption value for at least one of a power consumption and a load of a computing device as a substitute, at least in part, for missing sensor data regarding the subset of power elements.

16. The computer program product of claim 10, the program instructions further comprising:
program instructions to identify a change that has occurred with respect to one or more of (i) an amount of power available to the power delivery system, (ii) the topography for the power delivery system, and (iii) the group of computing devices;
program instructions to determine that the change meets a criteria for alteration of a power management policy for one or both of the power delivery system and the group of computing devices; and
program instructions to, based, at least in part, on the change, modify at least one of (ii) an assignment of one or more worker programs of the pool of worker programs and (iii) a processing of one or more tasks by one or more worker programs of the pool of worker programs.

17. The computer program product of claim 16, the program instructions further comprising:
program instructions to respond to meeting one or more criteria for alteration of a power management policy, initiating, by the one or more computer processors, the generation of a new power management task for a given power element of the one or more power elements based, at least in part on the change.

18. The computer program product of claim 10, wherein assignment of (i) managing power elements to tasks and (ii) tasks to workers is determined based on a set of rules that account for trade-offs between one or more of: (i) a required controlled action responsiveness, (ii) a resource needed to monitor power elements and control power consumption, (iii) a consistency of power allocation associated with a plurality of power elements in the topography, (iv) an availability, as a whole, of a power control system that controls at least a part of the power delivery system, and (v) a failing subset of worker programs.

19. A computer system for controlling power distribution, the computer system comprising:
   one or more computer processors;
   one or more computer readable storage medium;
   program instructions stored on the computer readable storage medium for execution by at least one of the one or more processors, the program instructions comprising:
      program instructions to determine a topography for a power delivery system that powers a group of computing devices;
      program instructions to determine a number of worker programs for a pool of worker programs based, at least in part, on the topography;
      program instructions to generate the pool of worker programs, wherein the pool of worker programs includes (i) the number of worker programs and (ii) a number of back-up worker programs;
      program instructions to generate a number of power management tasks to manage power consumption through one or more power elements included in the topography of the power delivery system; and
      program instructions to send one or more of the number of power management tasks to a worker program included in the pool of worker programs.

20. The computer system of claim 19, the program instructions further comprising:
   program instructions to identify a change that has occurred with respect to one or more of (i) an amount of power available to the power delivery system, (ii) the topography for the power delivery system, and (iii) the group of computing devices;
   program instructions to determine that the change meets a criteria for alteration of a power management policy for one or both of the power delivery system and the group of computing devices; and
   program instructions to, based, at least in part, on the change, modify at least one of (ii) an assignment of one or more worker programs of the pool of worker programs and (iii) a processing of one or more tasks by one or more worker programs of the pool of worker programs.

* * * * *